(12) United States Patent
Fobel et al.

(10) Patent No.: US 10,960,398 B2
(45) Date of Patent: Mar. 30, 2021

(54) MULTIPLEXED DROPLET ACTUATION AND SENSING IN DIGITAL MICROFLUIDICS

(71) Applicant: SCI-BOTS INC., Kitchener (CA)

(72) Inventors: Ryan Fobel, Kitchener (CA); Christian Fobel, Waterdown (CA); Aaron R. Wheeler, Toronto (CA)

(73) Assignee: SCI-BOTS INC., Kitchener (CA)

( * ) Notice: Subject to any disclaimer, the term of this patent is extended or adjusted under 35 U.S.C. 154(b) by 103 days.

(21) Appl. No.: 16/325,309

(22) PCT Filed: Aug. 17, 2017

(86) PCT No.: PCT/CA2017/050975
§ 371 (c)(1),
(2) Date: Feb. 13, 2019

(87) PCT Pub. No.: WO2018/035602
PCT Pub. Date: Mar. 1, 2018

(65) Prior Publication Data
US 2019/0201902 A1 Jul. 4, 2019

Related U.S. Application Data

(60) Provisional application No. 62/377,805, filed on Aug. 22, 2016.

(51) Int. Cl.
*G01N 27/447* (2006.01)
*B01L 3/00* (2006.01)
(Continued)

(52) U.S. Cl.
CPC ........ *B01L 3/502792* (2013.01); *G01F 22/00* (2013.01); *G01N 15/1031* (2013.01);
(Continued)

(58) Field of Classification Search
CPC ............... B01L 3/502784; B01L 3/502792
See application file for complete search history.

(56) References Cited

U.S. PATENT DOCUMENTS 8,367,370 B2   2/2013   Wheeler et al.
8,872,527 B2   10/2014  Sturmer et al.
(Continued)

FOREIGN PATENT DOCUMENTS

WO   2018039281 A1   3/2018

OTHER PUBLICATIONS

Sadeghi et al., "On Chip Droplet Characterization: A Practical, High-Sensitivity Measurement of Droplet Impedance in Digital Microfluidics," Anal. Chem, 2012, 84, 1915-1923, with Supplementary Information appended, unpaginated. (Year: 2012).*

(Continued)

*Primary Examiner* — Alexander S Noguerola
(74) *Attorney, Agent, or Firm* — Hill & Schumacher

(57) ABSTRACT

The present disclosure discloses a multi-droplet sensing and actuation system, for use in a digital microfluidic chip operation wherein a linearly independent alternating current signal is applied to each discrete actuation electrode thus encoding the electrode's identity. The combined measured impedance signal from multiple channels is then processed to decode an impedance measurement for the volume between each discrete actuation electrode and its corresponding conductive counter electrode region, where the sensed impedance is inversely proportional to an amount of liquid within the volume.

20 Claims, 22 Drawing Sheets

(51) Int. Cl.
G01P 5/08 (2006.01)
G01F 22/00 (2006.01)
G01N 15/10 (2006.01)

(52) U.S. Cl.
CPC ..... *G01N 15/1056* (2013.01); *G01N 27/4473* (2013.01); *G01N 27/44791* (2013.01); *G01P 5/08* (2013.01); *B01L 2200/10* (2013.01); *B01L 2300/089* (2013.01); *B01L 2300/0816* (2013.01); *B01L 2300/0819* (2013.01); *B01L 2400/0415* (2013.01); *B01L 2400/0427* (2013.01); *G01N 2015/1075* (2013.01)

(56) References Cited

U.S. PATENT DOCUMENTS

| | | | |
|---|---|---|---|
| 9,266,076 | B2 | 2/2016 | Kim et al. |
| 9,448,223 | B2 | 9/2016 | Shih et al. |
| 2010/0194408 | A1 | 8/2010 | Sturmer et al. |
| 2010/0307922 | A1 | 12/2010 | Wu |
| 2013/0168250 | A1 | 7/2013 | Fogleman et al. |
| 2016/0228893 | A1 | 8/2016 | Winger |
| 2016/0296935 | A1 | 10/2016 | Gao |

OTHER PUBLICATIONS 4.3 Linaearly Independent Sets; Bases downloaded on Aug. 3 ,2020 from http://www2.math.uconn.edu/~troby/math2210f16/LT/sec4_3.pdf (Year: 2020).*

International Search Report of the parent PCT application PCT/CA2017/050975 dated Nov. 30, 2017.

Luk, V. N. & Wheeler, A. R., A Digital Microlluidic Approach to Proteomic Sample Processing. Anal. Chem. 81, 4524-4530 (2009).

Au, S. H., Kumar, P. & Wheeler, A. R., A New Angle on Pluronic Additives: Advancing Droplets and Understanding in Digital Microfluidics. Langmuir 27, 8586-8594 (2011).

Shih, S. C. C., Fobel, R., Kumar, P. & Wheeler, A. R., A feedback control system for high-fidelity digital microfluidics. Lab. Chip 11, 535-540 (2011).

Vallet, M., Vallade, M. & Berge, B., Limiting phenomena for the spreading of water on polymer films by electrowetting. Eur. Phys. J. B 11, 583-591 (1999).

Verheijen, H. J. J. & Prins, M. W. J., Reversible Electrowetting and Trapping of Charge: Model and Experiments. Langmuir 15, 6616-6620 (1999).

Elvira, K. S., Leatherbarrow, R., Edel, J. & deMello, A., Droplet dispensing in digital microfluidic devices: Assessment of long-term reproducibility. Biomicrofluidics 6, 22003-22003-10 (2012).

Fair, R., Digital microfluidics: is a true lab-on-a-chip possible? Microfluid. Nanofluidics 3, 245-281 (2007).

Fobel, R., Fobel, C. & Wheeler, A. R. DropBot: An open-source digital microfluidic control system with precise control of electrostatic driving force and instantaneous drop velocity measurement. Appl. Phys. Lett. 102, 193513 (2013).

Gong, J. & Kim, C.-J. 'CJ'., All-electronic droplet generation on-chip with real-time feedback control for EWOD digital microfluidics. Lab. Chip 8, 898-906 (2008).

Shin, Y.-J. & Lee, J.-B., Machine vision for digital microfluidics. Rev. Sci. Instrum. 81, 14302 (2010).

Hadwen, B. et al., Programmable large area digital microfluidic array with integrated droplet sensing for bioassays. Lab. Chip 12, 3305-3313 (2012).

Cho, H. M. & Kim, C.-J., Creating, transporting, cutting, and merging liquid droplets by electrowetting-based actuation for digital microfluidic circuits. Microelectromechanical Syst. J. of 12, 70-80 (2003).

Song, J. H., Evans, R., Lin, Y.-Y., Hsu, B.-N. & Fair, R. B., A scaling model for electrowetting-on-dielectric microfluidic actuators. Microfluid. Nanofluidics 7, 75-89 (2009).

Berthier, J. et al. Computer aided design of an EWOD microdevice., Sens. Actuators Phys. 127, 283-294 (2006).

European Search Report dated Jan. 11, 2021, for Europe Application No. 17842482.6 filed Aug. 17, 2017.

* cited by examiner

US 10,960,398 B2

MULTIPLEXED DROPLET ACTUATION AND SENSING IN DIGITAL MICROFLUIDICS

FIELD

The present disclosure relates to a dynamic, electrical control system that can be utilized in a digital microfluidics (DMF) chip [also known as an "electrowetting" chip or an "electrowetting-on-dielectric" (EWOD) chip].

BACKGROUND

Digital microfluidic chips are a technology for use in the micromanipulation of discrete droplets of fluid. This technology is employed as an alternative to conventional lab-on-a-chip systems. Conventional lab-on-a-chip systems typically use micro-scale mechanical devices (pumps, valves etc.) for the manipulation of the enclosed fluid. In contrast, in DMF systems, there are no moving parts; droplets are simply manipulated on a stationary array of electrodes covered by a dielectric layer. When one or more electrodes in the array is actuated (i.e., an electrical potential is applied to that/those electrode/s), the dielectric becomes locally polarized near the activated electrode(s). If one or more droplets are in the vicinity of the activated electrode(s), it is drawn over it/them, allowing direct manipulation of said droplets. This scheme allows for a number of unit droplet operations, including movement, merging, splitting, dispensing, and storing.

In the use of a DMF chip, there is a need to achieve fully automated control of said chips. Realizing this level of control requires strategies to detect and recover from the many possible errors that can occur during routine operation, including fabrication defects (e.g., shorts between electrodes, broken traces, dielectric breakdown), and surface modifications that occur during use (e.g., biofouling,[1-3] ionization,[4] or charge trapping[5] caused by voltage saturation). These error-conditions can make it difficult or impossible to achieve any given operation that comprises moving a droplet to or from an affected electrode. In addition, some operations such as splitting and dispensing can be unpredictable even without defects or surface changes—i.e., the time required to complete these operations and the final volumes of daughter droplets are highly sensitive to the starting conditions (e.g., the volume and placement of the mother droplet,[6] surface tension,[7] etc.). Therefore, it is critical that digital microfluidics be paired with a detection system that is capable of sensing failure modes and also able to provide fast, dynamic control of splitting operations. Ideally, such a system would be simple, low-cost, and easy to integrate into existing systems.

The capability to sense droplet position and failure modes has been demonstrated with the open-source "DropBot" system.[8] DropBot applies a common alternating current (AC) actuation signal to all actuated electrodes and measures the combined feedback signal from all actuated electrodes simultaneously and thus (unfortunately) has no means for isolating any single electrode. For DMF to be scalable, the detection system must be able to track the behavior of multiple droplets across many different electrodes in parallel. There are several functional approaches for implementing multi-electrode, parallel sensing. Gong and Kim[9] described a simple method based on a ring oscillator circuit which they applied to droplet dispensing and splitting under proportional-integral-derivative (PID) control. They improved the precision of dispensed droplet volumes from +/−5% to +/−1% and demonstrated the ability to perform non-symmetric splitting. The major limitation to their method is that it only works with DC actuation, which has several drawbacks relative to AC operation, including an increased susceptibility to forces that resist droplet movement. Shin and Lee[10] demonstrated a machine-vision approach for tracking a single droplet which could be extended to track multiple droplets in theory; however, such a system would be non-trivial to implement and operate. Image-based methods require extensive processing, high-speed cameras (if they are to capture droplet dynamics), controlled lighting, and they may be sensitive to the visual appearance of liquids (e.g., color). Furthermore, it is unlikely that an optically based system could explain a given observed problem—e.g., dielectric breakdown, shorts, and broken traces may appear the same to an optical sensor. One system that seems well suited for multi-electrode fault detection is the active, thin-film transistor (TFT) array-based device recently reported by Hadwen et al.[11] These DMF devices consist of a 64×64 electrode array, each with its own integrated capacitive sensor that can perform measurements at a rate of 50 Hz.

This technology clearly has great potential, having achieved a scale (in terms of the number of addressable electrodes) that is orders of magnitude higher than any competing methods; however, fabricating these devices requires access to an industrial manufacturing line and therefore this technology is currently only available to employees of Sharp Corporation (Ichinomoto-cho, Tenri-shi, Japan) and their collaborators. Further, when produced at scale, it is not clear that TFT-based devices could ever be formed at appropriate cost for the single use (disposable) device requirements for many applications (e.g., applications involving biological samples are inherently limited by device lifetime). Thus, there is a critical need for an AC-compatible system for multi-droplet manipulation and sensing that is compatible with conventional, inexpensive devices.

SUMMARY

The present disclosure discloses a multi-droplet sensing and actuation system summarized in the flow chart in FIG. 19, for use in a digital microfluidic chip operation to track liquid volume and droplet position in real-time by applying a linearly independent alternating current signal to each discrete actuation electrode thus encoding the electrode's identity. The combined measured impedance signal from multiple channels is then processed to decode an impedance measurement for the volume between each discrete actuation electrode and its corresponding conductive counter electrode region, where the sensed impedance is inversely proportional to an amount of liquid within the volume.

In an embodiment, there is provided a digital microfluidic chip device, comprising:

A) a digital microfluidic chip including
  i) a first substrate having mounted on a surface thereof a first array of discrete actuation electrodes;
  ii) a dielectric layer coating said first array of discrete actuation electrodes, said dielectric layer having a hydrophobic surface
  iii) a second substrate having a hydrophobic surface on a conductive counter electrode, wherein the second substrate is in a spaced relationship to the first substrate thus defining a region between the first and second substrates B) an active control system including
  i) a controller capable of selectively actuating and de-actuating said discrete actuation electrodes, said controller being configured to apply a linearly independent alternating current electrical signal to each discrete actuation electrode such that said linearly independent alternating current electrical signal encodes the electrode's identity, ii) an impedance sensor for sensing, in parallel, an impedance in a volume between each discrete actuation electrode and a corresponding conductive counter electrode region spaced from said discrete actuation electrode, said impedance sensor being configured to process a combined measured impedance signal in order to decode from said combined measured impedance signal a distinct impedance measurement for the volume between each discrete actuation electrode and its corresponding conductive counter electrode region, wherein the impedance sensed in the volume between a given actuation electrode and said corresponding conductive counter electrode region is inversely proportional to an amount of liquid in said volume.

In an embodiment, the linearly independent alternating current electrical signal may be generated for each discrete actuation electrode by turning an AC signal, which is common to all discrete actuation electrodes, on and off in a sequence of pre-programmed steps distinct from all other discrete actuation electrodes.

In an embodiment, the active control system is configured to apply different alternating current (AC) signals with different frequencies to each discrete actuation electrode.

In an embodiment, the linearly independent alternating current electrical signal may be generated for each discrete actuation electrode by:

i) generating a linearly independent low voltage AC encoding signal that is unique to each discrete actuation electrode, ii) applying said linearly independent low voltage AC encoding signal to each discrete actuation electrode as is or coupling it onto an AC actuation signal that is common to all actuation electrodes.

In an embodiment, the linearly independent alternating current electrical signal may be generated for each discrete actuation electrode by:

i) generating a linearly independent low voltage AC encoding signal that is unique across a subset of discrete actuation electrodes, ii) turning said linearly independent low voltage AC encoding signal on and off in a sequential pattern to generate a switched signal distinct from all other discrete actuation electrodes in said subset iii) applying the switched signal to each discrete actuation electrode as is, or coupling it onto an AC actuation signal that is common to all actuation electrodes.

In an embodiment, the active control system may be configured to apply different alternating current (AC) signals at different frequencies to each different subset of discrete actuation electrodes such that each subset of discrete actuation electrodes receives the same frequency different from each other subset.

In an embodiment, the active control system may be configured to apply, to each discrete actuation electrode within each subset, a uniquely encoded alternating current signal which is generated by turning the alternating current signal corresponding to its associated subset, on and off in a sequential pattern distinct from all other discrete actuation electrodes within its subset.

In any or all of these embodiments, the conductive counter electrode may be a single counter electrode section.

Alternatively, in any or all of these embodiments, the conductive counter electrode may include multiple conductive electrode sections electrically isolated from each other.

In an embodiment, there is provided a method for measuring properties of a fluid droplet on a DMF device, comprising, generating a linearly independent alternating current electrical signal;

applying said linearly independent alternating current signal to each discrete actuation electrode to actuate said electrode;

measuring the total impedance, capacitance or combination of impedance and capacitance of all actuation electrodes, or a subset of actuation electrodes, to decode one or a combination of the impedance and capacitance measurement for each discrete actuation electrode; and processing each of the measurements to measure the volume of liquid between each discrete actuation electrode and its corresponding conductive counter electrode region.

An alternating current signal may be generated so that a linearly independent alternating current signal with a unique frequency is applied to each of the discrete actuation electrodes.

An embodiment of the method further comprising manipulating the fluid droplet to move onto an adjacent discrete actuation electrode by applying a linearly independent alternating current signal to the discrete actuation electrode that is adjacent to the discrete actuation electrode on which a fluid volume is detected.

In an embodiment the position of the fluid droplet is measured and the fluid droplet is manipulated to prevent unintended merging of the fluid droplet with additional fluid droplets on the DMF device.

The method may further comprise manipulating the fluid droplet to split it into two discrete droplets by applying linearly independent alternating current signals to two or more discrete actuation electrodes that are adjacent to the discrete actuation electrode(s) on which a fluid volume is detected.

The method may further comprise dispensing a portion of the fluid droplet onto an adjacent discrete actuation electrode by applying linearly independent alternating current signals to both the adjacent discrete actuation electrode and the discrete actuation electrode on which a fluid droplet is detected.

In an embodiment the capacitance of each discrete actuation electrode may be measured continuously as a function of time, and wherein the capacitance measurements are used to calculate the velocity of a fluid droplet.

In an embodiment the velocity of fluid droplets measured across multiple discrete actuation electrodes are combined to display a schematic representation of the actuation electrodes wherein each electrode is colored to indicate the velocity of last droplet to pass over it.

In an embodiment one or a combination of the impedance and capacitance is measured continuously to measure the change in static droplet volume over time, and wherein the change in droplet volume over time is used to determine the rate of evaporation of the fluid droplet.

The method may further comprise optimizing the operating parameters for manipulating a fluid droplet of a given liquid on a DMF chip to achieve maximum droplet velocity or sustained droplet velocity over time, wherein this step of optimizing may comprise plotting the droplet velocity of a sample liquid as a function of one or a combination of the frequency and voltage to determine one or a combination of the frequency and voltage that will result in a maximum droplet velocity or sustained droplet velocity over time.

The methods disclosed herein may be employed for several droplets simultaneously.

A further understanding of the functional and advantageous aspects of the present disclosure can be realized by reference to the following detailed description and drawings.

BRIEF DESCRIPTION OF THE DRAWINGS

Embodiments disclosed herein will be more fully understood from the following detailed description thereof taken in connection with the accompanying drawings, which form a part of this application, and in which.

DETAILED DESCRIPTION

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms "comprises" and "comprising" are to be construed as being inclusive and open ended, and not exclusive. Specifically, when used in the specification and claims, the terms "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately" are meant to cover variations that may exist in the upper and lower limits of the ranges of values, such as variations in properties, parameters, and dimensions.

As used herein, the terms "channel" and "electrode" are meant to refer to an individual electrode, although in practice, multiple electrodes can be "bussed" together (controlled by a single channel).

Figure 1:
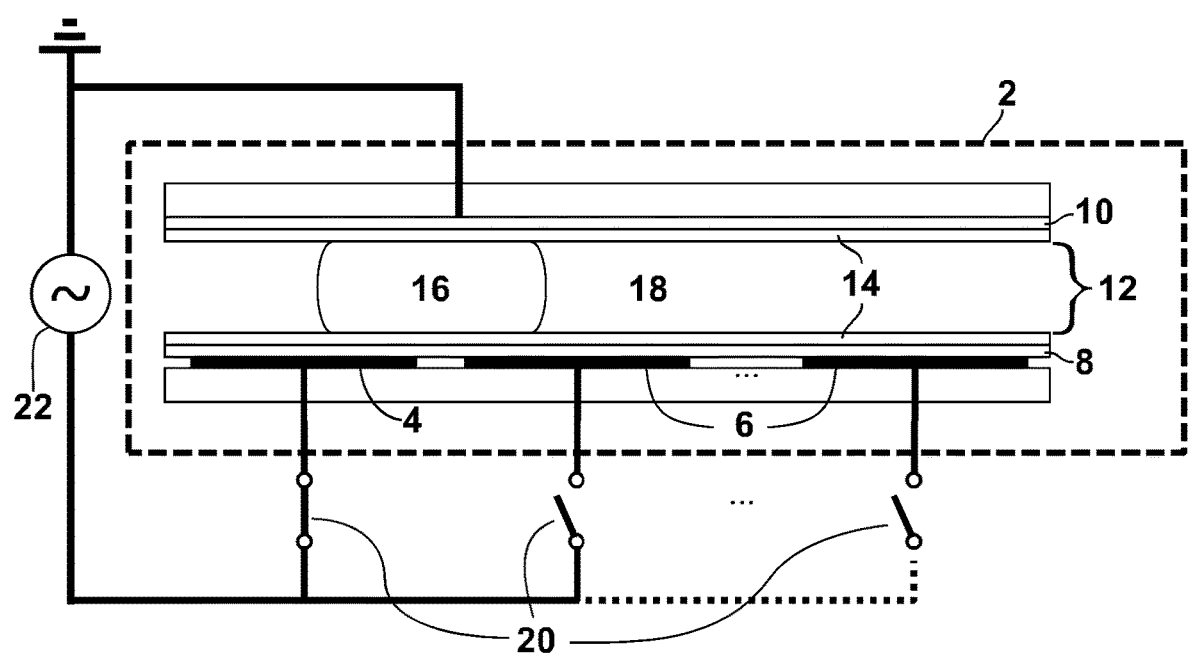
FIG. 1 shows a simplified circuit schematic of a DMF control system and a side view of a DMF device with sections of interest (droplet, electrode and dielectric layer) highlighted.

Referring to FIG. 1, a DMF chip is shown generally at 2. The DMF chip 2 includes a layer of actuated and non-actuated electrically conductive electrodes as shown at 4 and 6 respectively. It also contains a layer of dielectric material 8 and a layer of a single or plurality of electrodes 10 and a region 12 forming a gap between the hydrophobic coatings 14 on 10 and 8 wherein one or more fluid droplets 16 can reside within a filler media 18 (typically air or oil). Electrical signals for driving the motion of the droplets and sensing their dynamics are applied to electrodes 4, 6 by turning on high voltage switches 20 which are connected to a high voltage signal generator 22.

Figure 2:
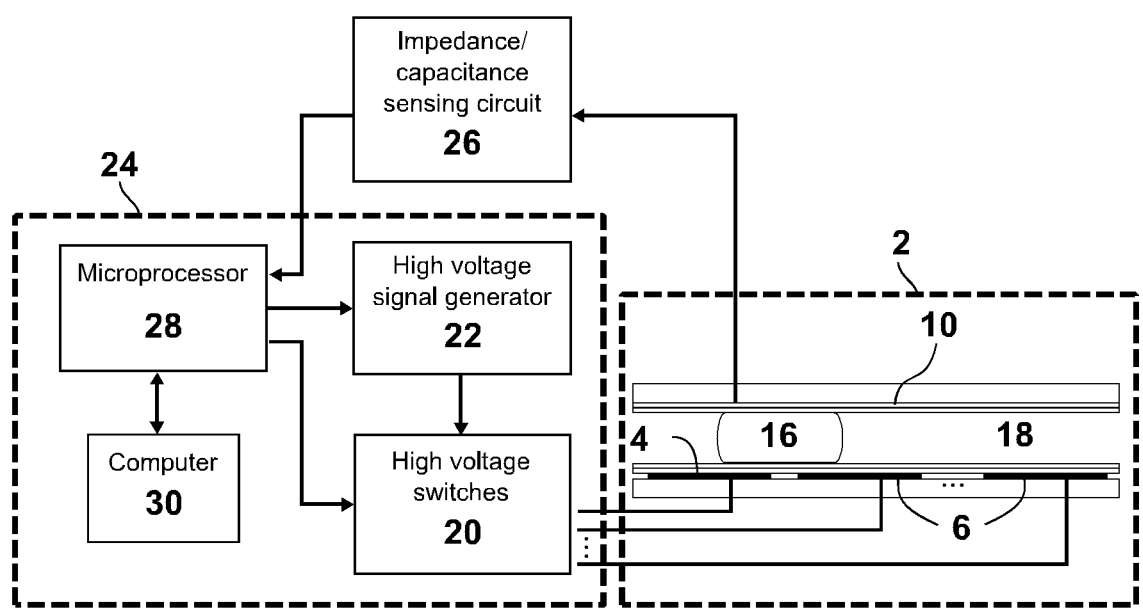
FIG. 2 shows a system-level overview of a DMF control system and chip including an impedance/capacitance sensing circuit.

FIG. 2 shows a schematic overview of one embodiment of a DMF control system 24, chip 2, and impedance/capacitance sensing circuit 26. The control system 24 consists of a high voltage signal generator 22 and multiple, high voltage switches 20 which interface with electrodes 4, 6 on the DMF chip 2. The amplitude and shape of the periodic waveform output by the high voltage signal generator 22 and the on/off state of each of the switches 20 are controlled by a microprocessor 28. The microprocessor 28 is also connected to an impedance/capacitance sensing circuit 26 which converts the amount of current flowing through the DMF device 2 (between the actuated electrodes 4 and their corresponding conductive counter electrode region 10) into an impedance/capacitance measurement. The microprocessor 28 can be configured to operate independently (i.e., to execute a sequence of pre-programmed steps) or alternatively, it can be controlled via a separate computer 30 connected either physically or via a wireless connection (e.g., WiFi or Bluetooth).

The automaticity of a DMF system is limited by the accuracy with which the volume and position of individual droplets can be tracked independently. Without real-time, parallel tracking of multiple discrete droplets, verification of intended system operation cannot be guaranteed. Moreover, to be of practical use, a parallel droplet tracking method must scale in terms of time resolution and measurement performance (i.e., signal-to-noise) as the number of channels and droplets increase. Therefore, the key requirement of the embodiments disclosed herein is to track multiple droplets in parallel including several strategies to achieve scalability, i.e., maintain droplet velocity and consistent sensing accuracy as the number of electrodes is increased. The present disclosure provides various embodiments for increasing the scalability and sensing performance of the system.

The various embodiments of the disclosure described herein employ various mechanisms to generate linearly independent alternating current electrical signals for each channel such that the impedance corresponding to each discrete channel can be decoded from the cumulative impedance measurement of one or more banks of channels. The encoding and decoding mechanisms described herein vary with respect to factors such as hardware complexity, software complexity, and cost.

High Side Sensing

Figure 3:
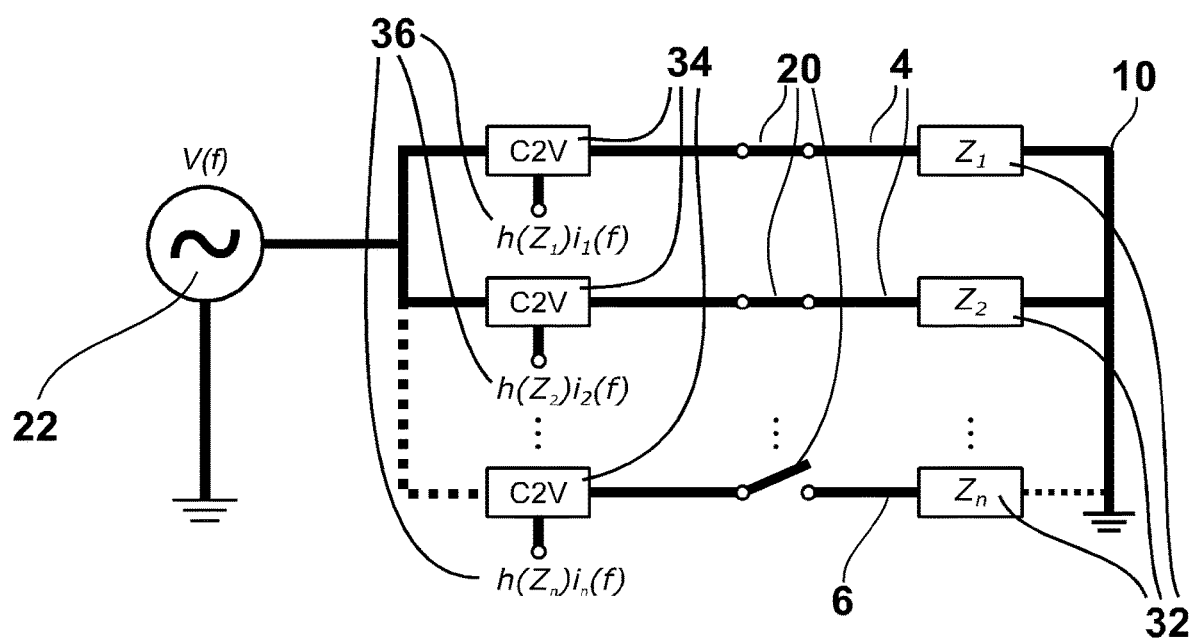
FIG. 3 shows a schematic of DMF control circuit with high side current sensing.

From a conceptual standpoint, the simplest means for sensing the impedance across multiple electrodes in parallel employs separate physical sensors for each distinct channel. An example of such an embodiment is shown in FIG. 3, wherein current sensing is applied to the high side of the load(s) rather than on the low side as shown in FIG. 2. A high voltage signal generator 22 provides a common actuation signal of voltage V and frequency f to a set of high voltage switches 20. When closed, these switches transmit this high voltage AC signal to a set of actuated electrodes 4. The volume between each actuation electrode and its corresponding counter electrode 10 has a characteristic impedance $Z_k$ 32 (where the k subscript corresponds to channel number), which is influenced by contributions of the dielectric material 8, filler media (e.g., air or oil) 18 and fluid droplet(s) 16 present between the actuation electrode 4, 6 and its corresponding counter electrode 10. $h(Z_k)$ is the effective gain applied by a current to voltage converter 34 based on the impedance $Z_k$ and $i_k(f)$ is the current passing through channel k. Each signal $h(Z_k)i_k(f_k)$ 36 is read by a microprocessor 28 through an analog to digital converter to compute the impedance of each actuated channels. Note that multiple current to voltage conversion circuits 34 are required in this configuration (one per channel), which leads to considerable hardware complexity and cost that scales linearly with the number of channels in the system.

Frequency-Division Multiplexing (FDM)

Figure 4:
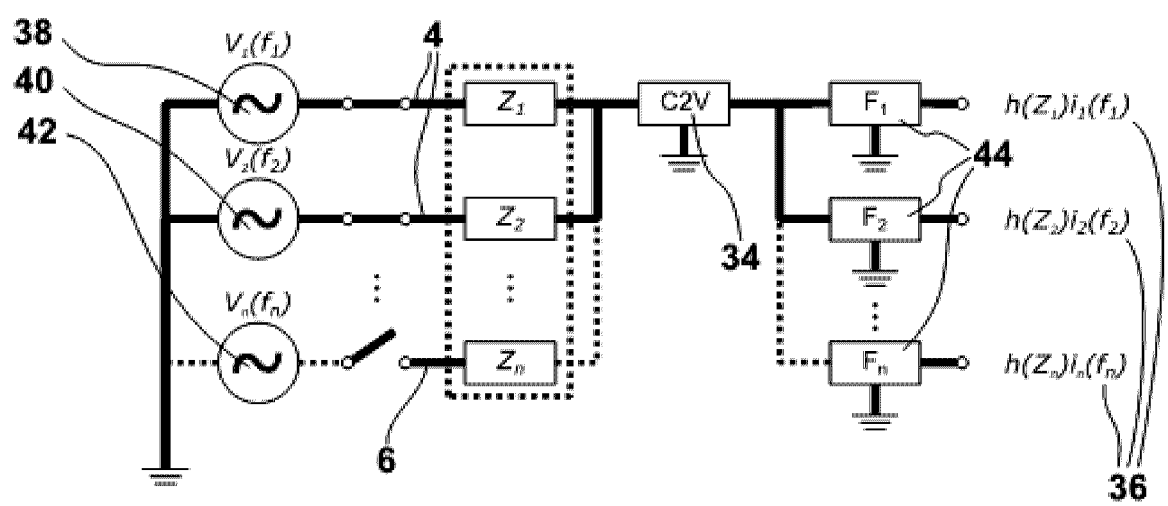
FIG. 4 shows a schematic of a low side, frequency-division multiplexing electrical circuit.
Figure 5:
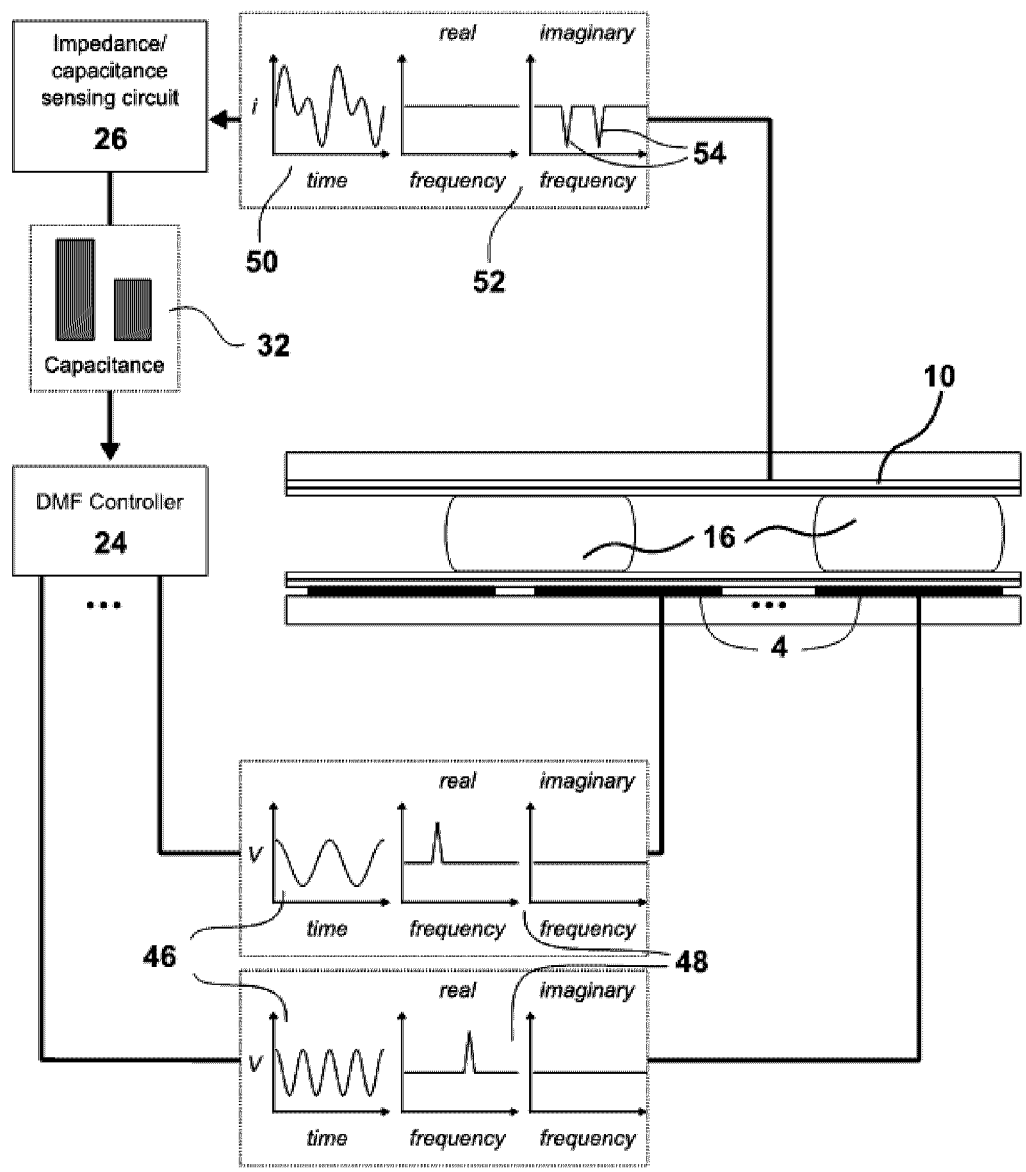
FIG. 5 shows a system-level overview of a DMF control system implementing low side, frequency-division multiplexing with representative time- and frequency-domain voltage and current signals.

The systems shown in FIG. 4 and FIG. 5 demonstrate an alternative configuration that employs frequency-based encoding, i.e., the generation of an AC signal for each channel having a frequency that is distinct to the corresponding channel. Frequency-based encoding and decoding is herein referred to as frequency-division multiplexing (FDM). In FIG. 4, multiple alternating current supplies 38, 40, 42 are required, each driving a single channel and using a distinct frequency ($f_1, f_2 \ldots f_n$). The combined current passing through all channels is measured using a low side current sensing configuration. By applying an appropriate (hardware or software) band-pass filter 44 to the output of the current to voltage converter 34 the signal corresponding to each individual channel 36 can be decoded. The decoded signal for each channel 36 is read by a microprocessor 28 through an analog to digital converter to compute the impedance of the corresponding channel.

FIG. 5 shows an alternative representation of the frequency-division multiplexing system described in FIG. 4. In this case, two electrodes 4 are being actuated simultaneously with two linearly independent AC voltage signals having different frequencies. These analog voltage signals can be equivalently described by their time-domain representation 46 or their complex-valued frequency spectra 48. The total current flowing through the counter electrode 10 is also plotted versus time 50 and as complex-valued frequency spectra 52 in which two peaks 54 are clearly visible (one corresponding to each electrode 4). The impedance/capacitance sensing circuit 26 decodes this total this total current signal to produce impedance (or capacitance) values 32 for each electrode 4.

Time-Division Multiplexing (TDM)

Figure 6:
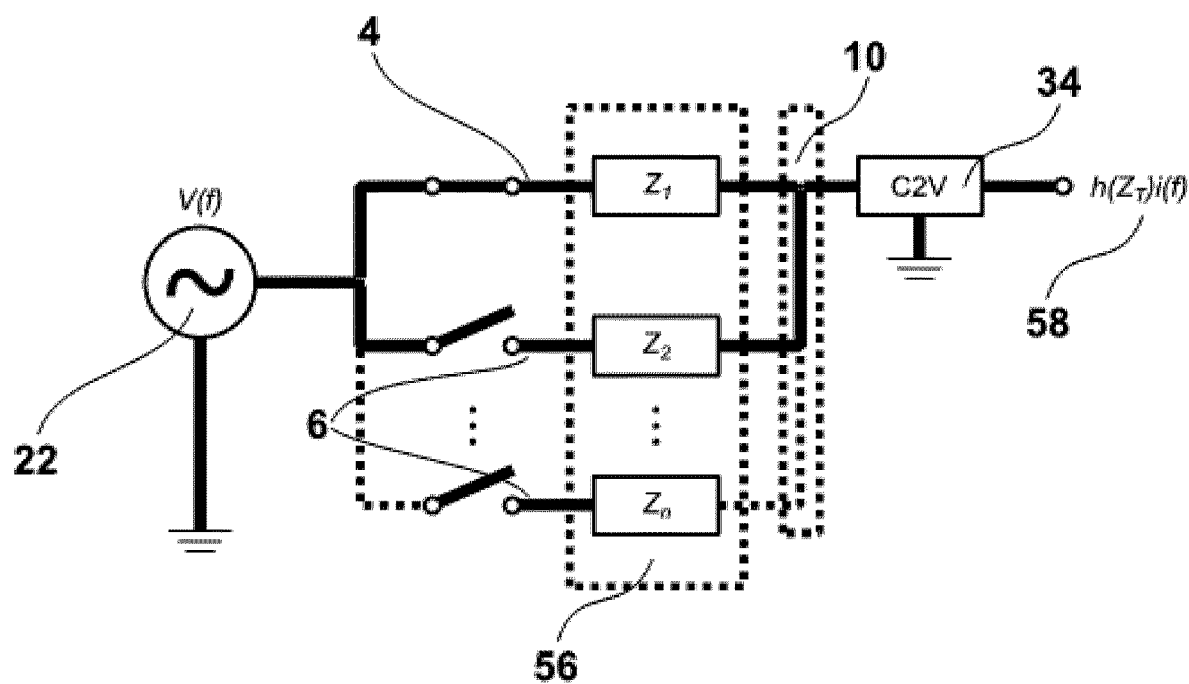
FIG. 6 shows a schematic of a low side, current sensing electrical circuit compatible with time-division multiplexing.

The system shown in FIG. 6 encodes a linearly independent alternating current signal for each actuation electrode by assigning a unique, periodic switching pattern to each channel. Signal encoding and decoding according to independent periodic switching of each channel is herein referred to as time-division multiplexing (TDM). A high voltage signal generator 22 provides a common actuation signal of voltage V at a frequency f to the actuating 4 and non-actuating channels 6. The total impedance, $Z_T$ 56 corresponds to the impedance over all actuated electrodes of the dielectric material 8 and the impedance of either the filler media (e.g., air or oil) 18 or fluid droplet(s) 16. $h(Z_T)$ corresponds to the effective gain applied by a current to voltage converter 34 based on the total impedance of all closed switch channel paths. The signal $h(Z_T)i(f)$ 58 is read by a microprocessor 28 through an analog to digital converter to compute the total impedance across all actuated channels.

Figure 7:
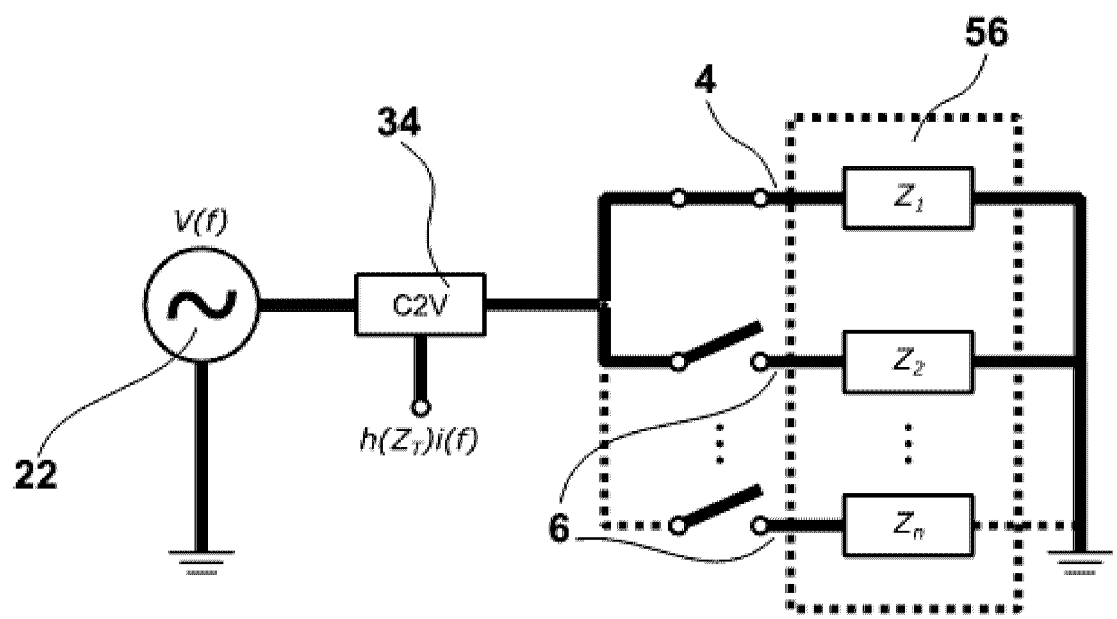
FIG. 7 shows a schematic of an equivalent high side, time-division multiplexing current sensing electrical circuit.

TDM may be used with impedance measuring mechanisms other than the low side current sensing employed in the DMF system shown in FIG. 6. Other compatible impedance measuring methods include, for example, a high side current sensing circuit shown in FIG. 7. This embodiment contains a high voltage signal generator 22 that leads into a current to voltage converter 34 located on the high side of the actuating channels 4, 6.

In the standard practice of DMF, the state of each electrode during a protocol step is binary. Referring to FIG. 6 the electrodes will be actuated electrodes 4 or non-actuated electrodes 6. This property is referred to as the actuation state, and it specifies whether or not an electrode is intended to generate an electrostatic force to cause a droplet to move. In addition to this specification, a second electrode property can be defined as sensitivity. This term describes whether or not the user wants to measure the impedance of an electrode during a given step. Further, three levels of time are introduced in FIG. 8: step with duration $t_{step}$ 60, measurement period with duration $t_{meas.-period}$ 62, and window with duration $t_{window}$ 64. A fourth (implicit) division of time for the case when the droplet is driven by an AC potential is the waveform period with duration $t_{wave-period}$ 66. These levels are progressively smaller—that is, $t_{step} > t_{meas.-period} > t_{window} > t_{wave-period}$.

Figure 8:
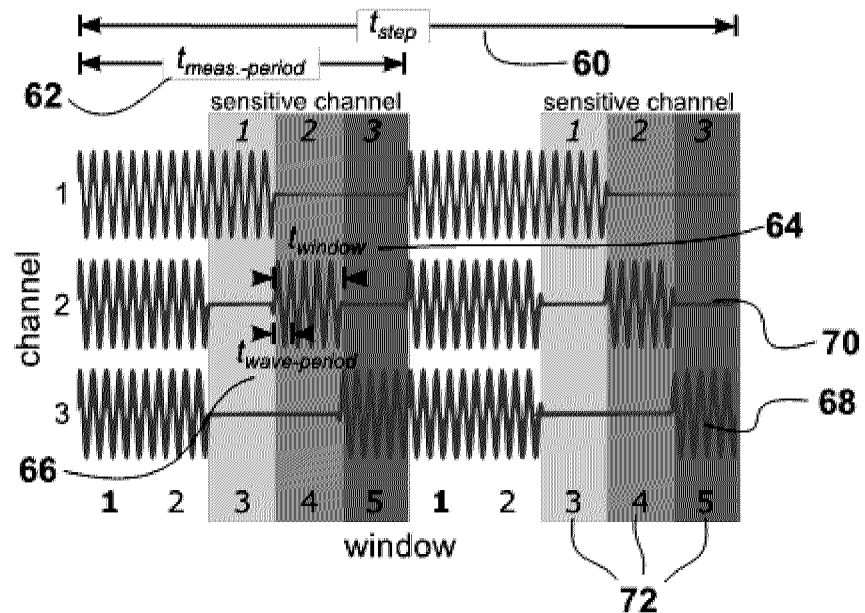
FIG. 8 shows a schematic representation of the actuation waveforms designed to implement time-division multiplexing for three different electrodes.

FIG. 8 illustrates TDM for a single step applied to three different electrodes, each controlled by a separate channel. As shown, during each window, an electrode is defined as on 68 (that is, driving voltage is applied) or off 70 (that is, driving voltage is not applied) based on the combination of its actuation state and its sensitivity. If an electrode is actuated 4, it is desirable to maximize the total amount of time that it is in the on state, and if it is non-actuated 6, this time should be minimized. If an electrode is sensitive, it must be on for at least one window within each measurement period 62. The term duty cycle is used to describe the relative portion of time a channel spends in its on state. In this example, each channel is actuated during the step 60, corresponding to a 60% duty cycle. Each channel is also sensitive during this step, because the states in windows 3, 4, and 5 (72) allow for the unique contribution of each channel to be decoded.

Switching Matrix

Based on these constraints, a switching matrix S can be defined to encode the actuation state of each channel during each measurement window in a measuring sequence, such that each row of S corresponds to a window within a measurement period and each column corresponds to a sensitive channel. The rows of this switching matrix are iterated through p times on each protocol step, where $p=t_{step}/t_{meas.-period}$. Each entry in the switching matrix, $S_{i,j}$, is equal to 1 if the channel in column j is on during window i, or 0 if it is off, where i is the row index (i=1, 2, . . . , m) and j is the column index (j=1, 2, . . . , n). The electrical admittance of each channel (where admittance is the inverse of the impedance) during each measurement period can be represented by a matrix Y. The following equation defines the m×p measurement matrix M as the dot product of S and Y:

$$SY=M$$

Therefore, by designing S (the switching matrix) such that it is invertible and by measuring M (i.e., the combined admittance of all channels that were in the on state during each window) over p periods, Y (the admittance for each electrode during each measurement period) can be estimated by its linear least-squares approximation:

$$Y=(S^TS)^{-1}S^TM$$

This quasi-parallel sensing approach makes an implicit assumption that all measurements acquired within a measurement period occur simultaneously, when in fact, they are collected sequentially. This assumption is only valid if $t_{meas.-period}$ is very short compared to the time-scale of droplet movement (i.e., $t_{meas.-period} \ll t_{step}$).

To avoid the requirement of a short measurement period, an intermediate step can be introduced between acquiring the measurements in M and solving for Y. Since each row in M represents an independent time series in which the same subset of channels are on, an interpolation step (e.g., polynomial interpolation) can be performed across each row to shift all measurements to a common timeframe. This interpolation requires its own assumption that each time series can be approximated (e.g., by a polynomial function) over the timescale of $t_{meas.-period}$.

Figure 9:
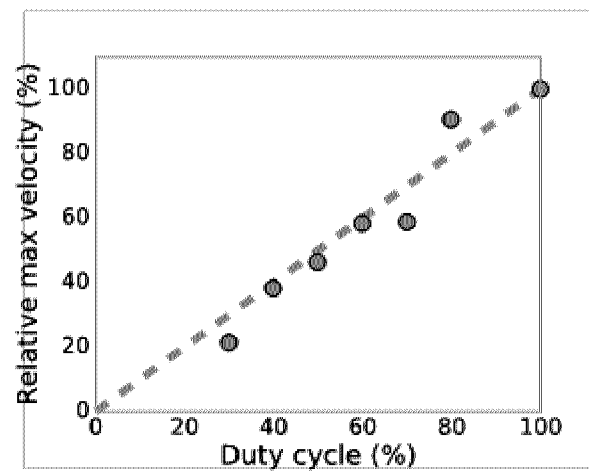
FIG. 9 presents experimental data showing relative velocity (compared to the maximum velocity) as a function of the duty cycle of the actuation waveform.

FIG. 9 demonstrates that duty cycle is proportional to the relative maximum velocity of the droplet. This understanding allows for the use of a very simple control system that outputs a single driving voltage, with droplet velocity (and driving force) modulated simply by changing the duty cycle. This also implies that sensing may be performed on non-actuated channels 6 by designing the switching matrix such that the respective column in the switching matrix has a very low duty cycle where the channel is off for the majority of the time.

Figure 10A:
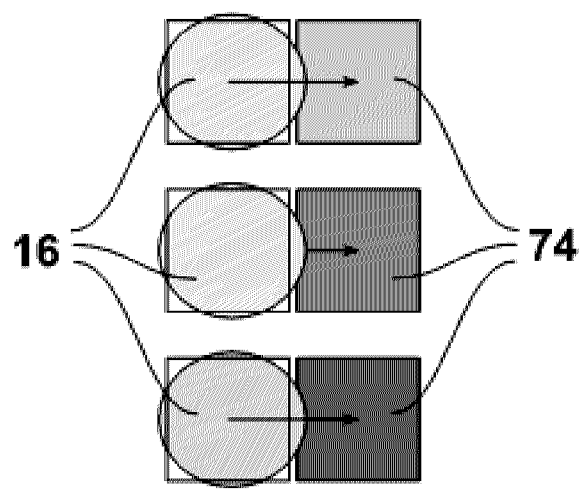
FIG. 10A shows a schematic of the movement of fluid droplets from the application of a voltage to adjacent electrodes.
Figure 10B:
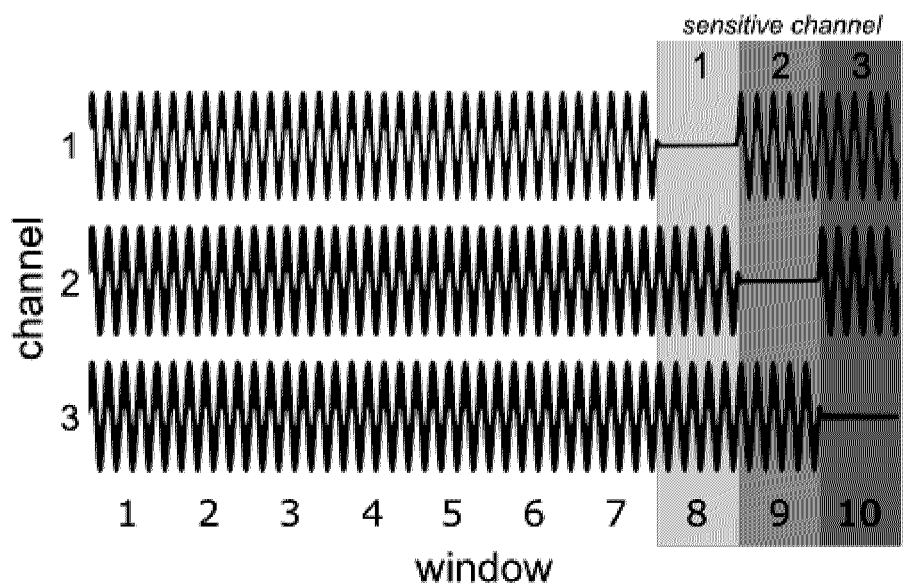
FIG. 10B shows time-division multiplexing waveforms applied to three different channels.
Figure 10C:
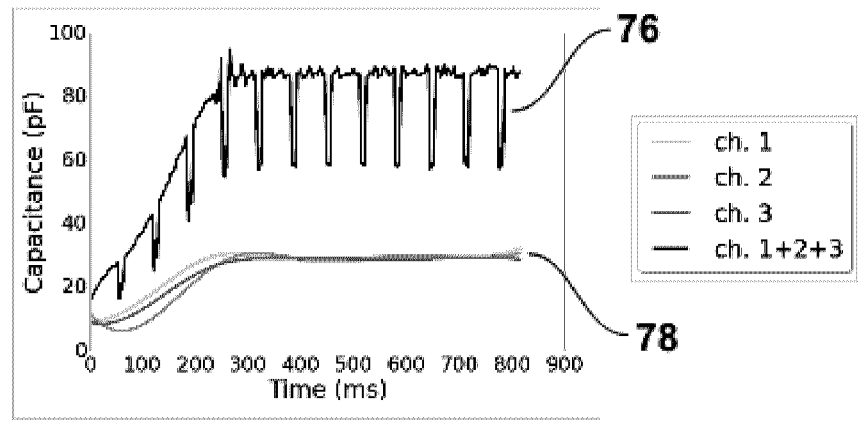
FIG. 10C shows a graphical representation of experimentally measured capacitance. It displays the sum of all electrode channels and three individually measured channels.
Figure 10D:
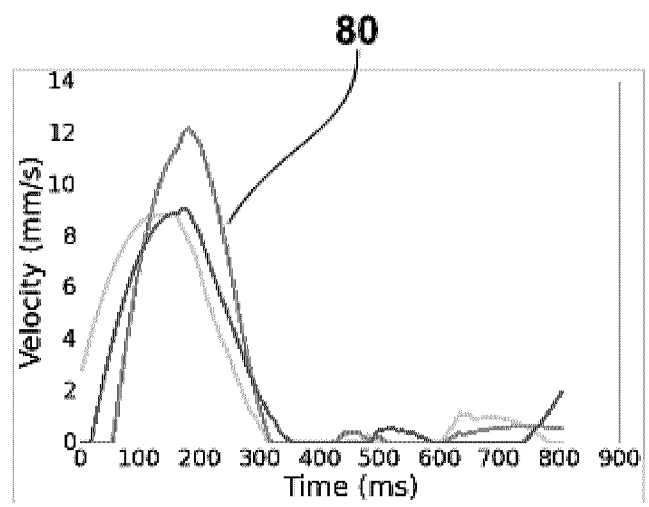
FIG. 10D shows a graphical representation of the experimentally measured velocity data from individual droplets moving onto adjoining electrodes, as illustrated in FIG. 10A.

The TDM embodiment of the technique was validated experimentally by driving three droplets 16 onto adjacent destination electrodes 74 simultaneously (as shown in FIG. 10A). FIG. 10B shows the actuation waveform applied to each channel. In this case, each of the actuated channels 4 are on for nine out of the ten windows (i.e., 90% duty cycle). FIGS. 10C and 10D highlight representative results. The sum of the capacitance of all channels that are on during each window 76 is measured as droplets move to the destination electrodes. These measurements are used to estimate the capacitance 78 and velocity 80 of each channel as a function of time in order to determine the dynamic capacitance and velocity of multiple translating droplets. This particular case is presented as an example to explain the theory of time-domain multiplexing. It is possible to implement various combinations of on and off channels in the embodiment.

Figure 11:
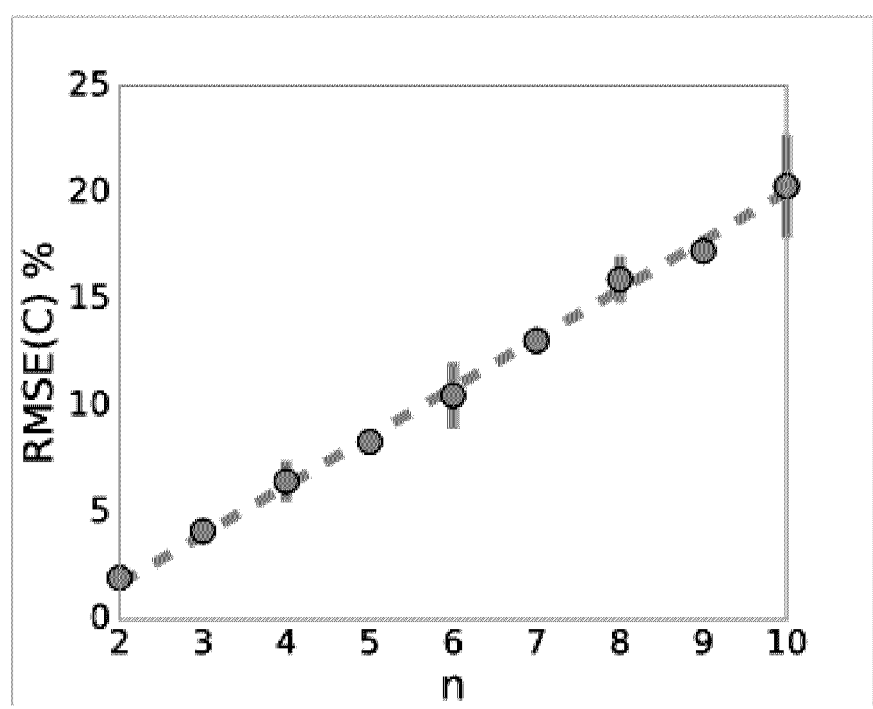
FIG. 11 shows a graphical representation of simulation results describing the root-mean-squared error in capacitance (RMSE(C)) relative to the number of DMF electrodes (n) being sensed in parallel.

FIG. 11 shows simulated results of the root-mean-squared error in measured capacitance for a step with ten measurement windows and between two and ten channels actuated simultaneously. One can see that the measurement error scales linearly with the number of channels being sensed in parallel. This suggests a limitation to the scalability of this technique. The following sections describe alternative embodiments that facilitate scaling of the described techniques to larger numbers of electrodes.

Grouping Channels with Separate Reference Electrodes

Figure 12A:
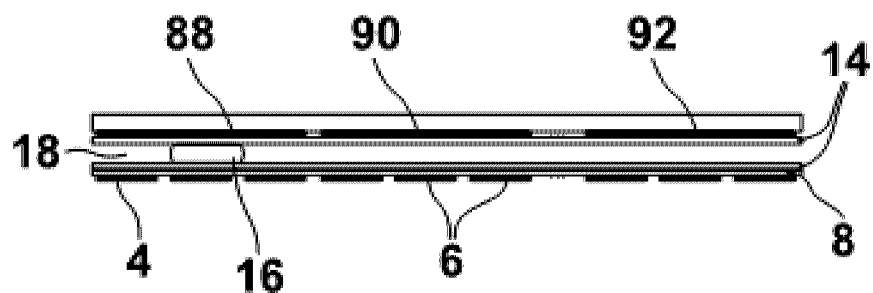
FIG. 12A shows a schematic representation of an electrical circuit used to implement time-division multiplexing with the reference electrode divided into multiple sections.

FIG. 12A shows an example of time-division multiplexing with a low side current sensing configuration based on the layout in FIG. 6. This configuration groups channels together into several banks (82, 84, 86), where a separate reference electrode is assigned to each bank (88, 90, 92). Time-division multiplexing can be applied within each bank to track multiple sensitive channels.

Figure 12B:
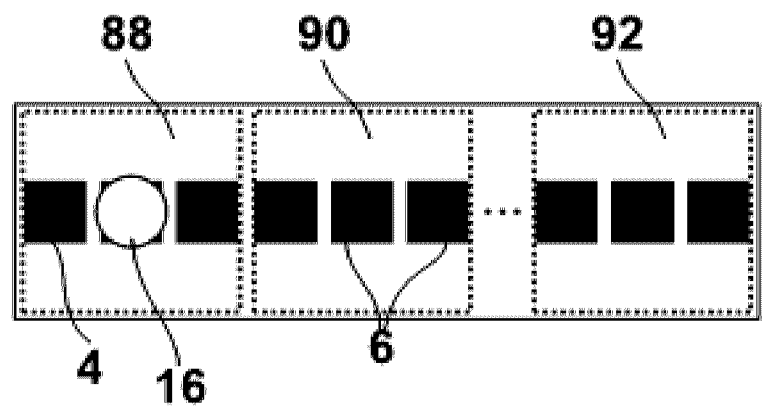
FIG. 12B shows a side elevation view of a DMF chip with the reference electrode divided into multiple sections.
Figure 12C:
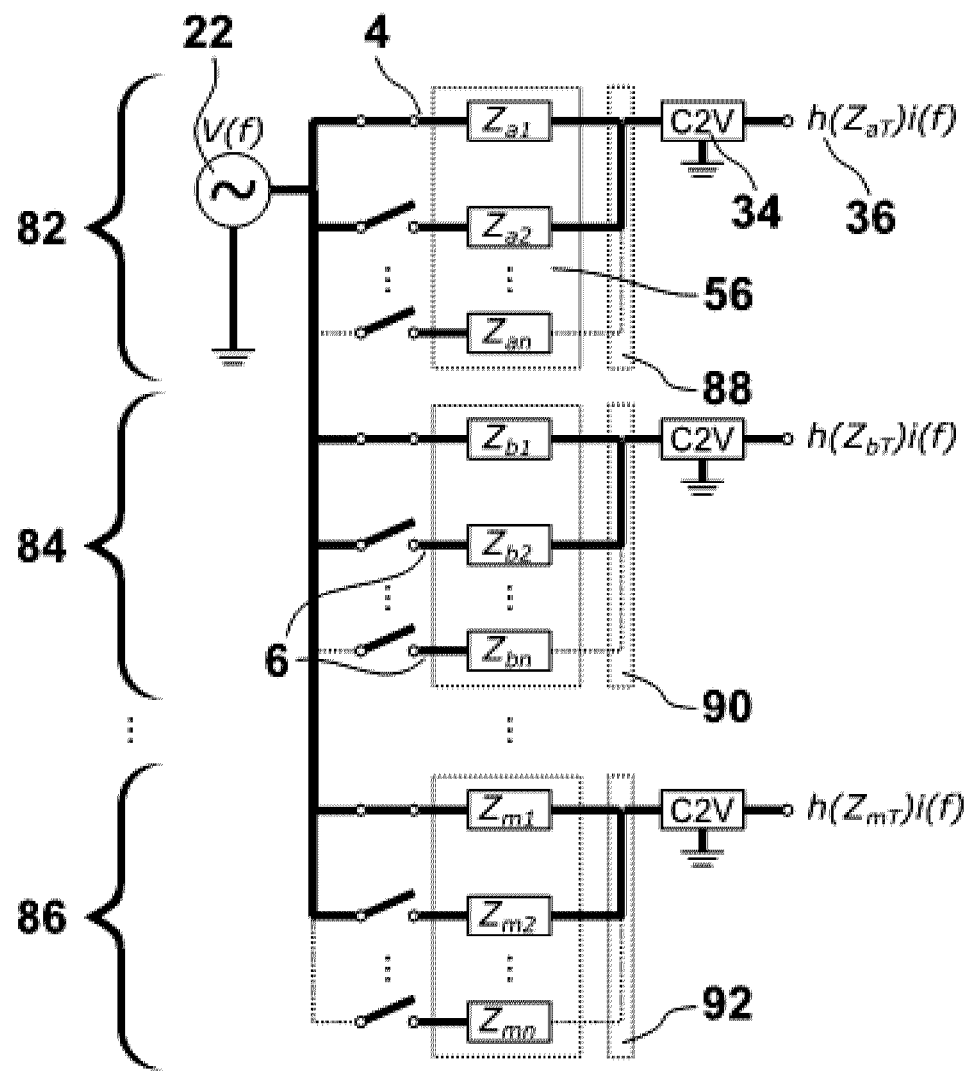
FIG. 12C shows a top elevation view of a DMF chip with the reference electrode divided into multiple sections.

FIG. 12B and FIG. 12C provide top and side views, respectively, of the embodiment that consists of multiple reference and actuated electrodes. The top plate area is divided into multiple reference electrode areas. Each reference electrode (88, 90, 92) covers a distinct bank of actuation electrodes (82, 84, 86). Within each bank of actuation electrodes, the combined total impedance 56 across all actuated channels is measured by means of a low side current to voltage converter 34, similar to the setup shown in FIG. 6. The impedances of all banks can be sampled concurrently by monitoring each corresponding current to voltage converter with, for example, a separate analog to digital converter. The impedance of multiple channels can be tracked within each bank of channels by applying time-division multiplexing when sampling the corresponding analog to digital converter.

Frequency-division multiplexing as described in FIG. 4 and FIG. 5 can also be applied in an analogous configuration (i.e., with frequency-encoded channels grouped into multiple banks, each with a separate reference electrode). In this case, the same frequency may be applied to multiple actuation electrodes provided that they do not share a common reference electrode.

Combined Time-Division and Frequency-Division Multiplexing

Figure 13:
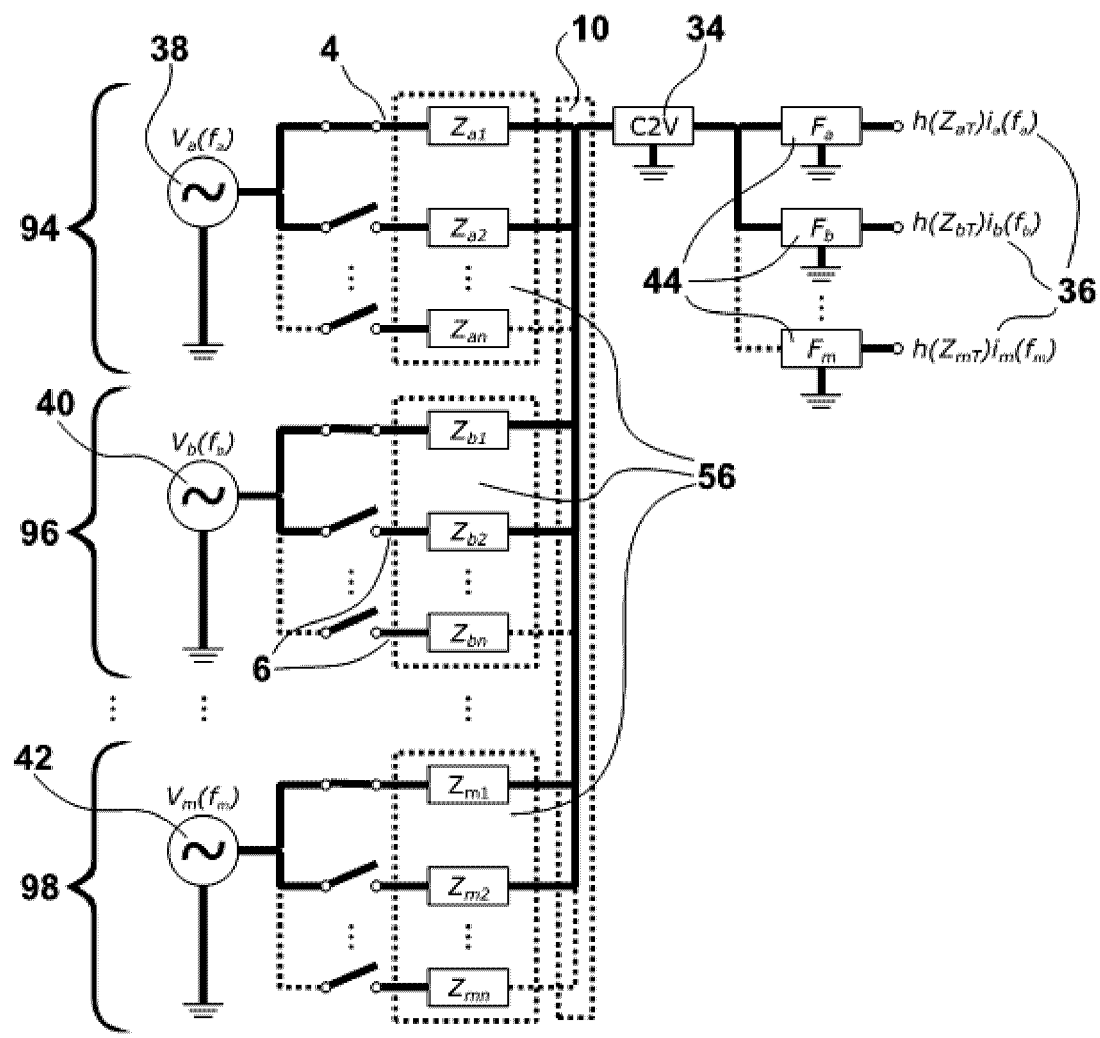
FIG. 13 shows a schematic of an electrical circuit compatible with combined frequency-division and time-division multiplexed sensing.

An embodiment that combines frequency and time-division multiplexing can be implemented. FIG. 13 shows a non-limiting example of a low side current sensing configuration compatible with time-division multiplexing and frequency-division multiplexing, based on the layouts in FIG. 6 and FIG. 4. This configuration groups channels together into several frequency banks (94, 96, 98), where FDM is applied by assigning each bank an actuation signal operating at a distinct frequency 38, 40, 42, and TDM is applied to track multiple sensitive channels concurrently within the frequency bank. Each band-pass filter 44 isolates the voltage signal corresponding to the current through the closed switch paths within the respective frequency bank of channels. Time-division multiplexing is applied within each frequency bank of channels to isolate the signal 36 associated with each discrete channel.

Independent Actuation and Encoding Signals

In all embodiments described above, impedance is measured based on the current applied through the actuation signal (i.e., the signal used for manipulating droplets). Sensing impedance through the actuation signal current is beneficial since it eliminates the need to include additional signal generation circuitry; however, impedance measurement from the actuation signal current also imposes limitations. First, in order to measure the impedance across a sensitive channel, the actuation signal must be applied to the corresponding channel (albeit only for the measurement duration). Second, in the case of frequency-division multiplexing, the range of usable encoding frequencies is limited to those appropriate for droplet actuation.

Figure 14:
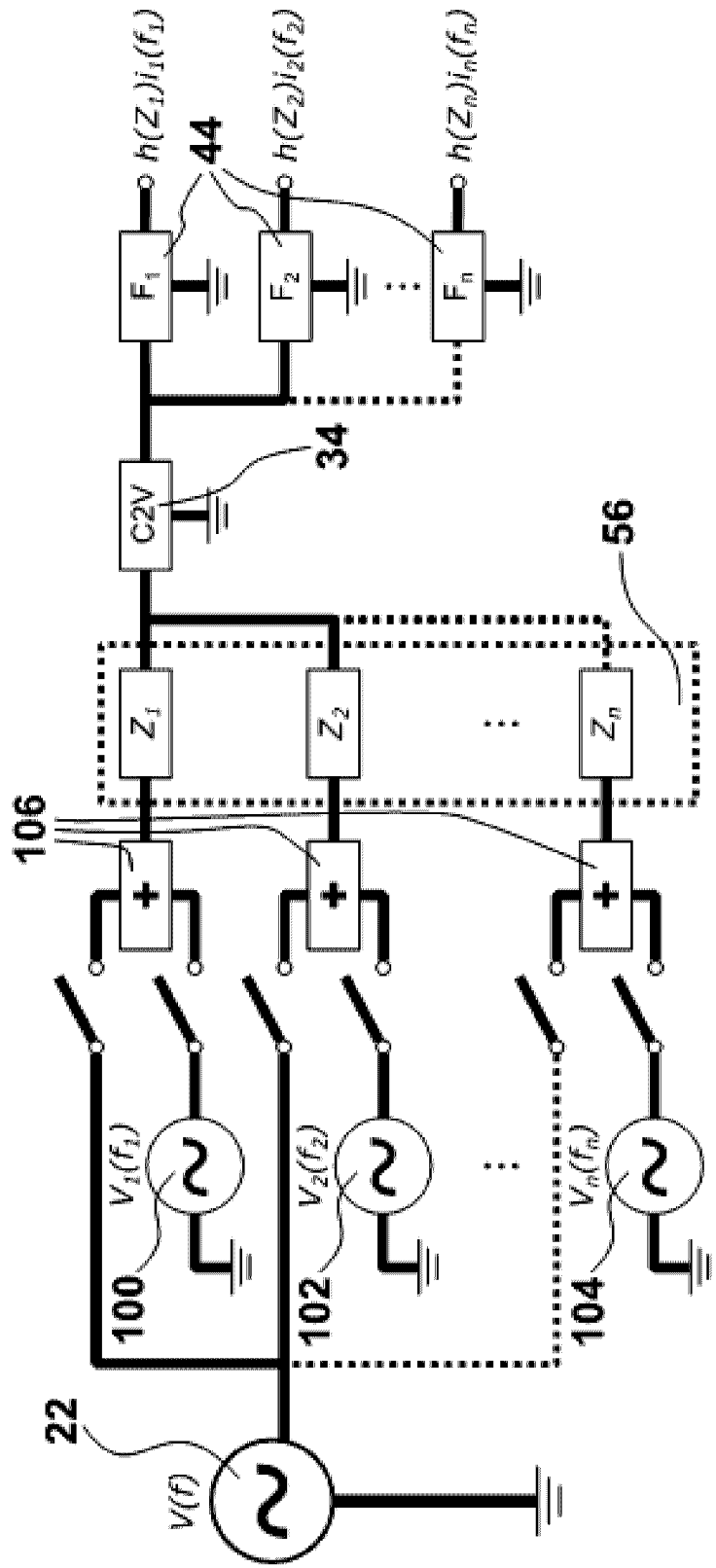
FIG. 14 shows a schematic of an electrical circuit used to implement time- and/or frequency-division multiplexing where the actuation and encoding signals are independent.

At the expense of increased circuit complexity, instead of measuring impedance using the current supplied by the actuation signal, each channel may be connected to an independent low voltage encoding signal, as shown in FIG. 14. Under this configuration, each encoding signal 100, 102, 104 may optionally be coupled to the actuation signal produced by a common high voltage signal generator 22 via analog coupling circuitry 106. In such a configuration, encoding and decoding of the channel impedances can be performed by TDM, FDM or a combination thereof. Note that under such a configuration, electrode actuation and sensing are independent; i.e., each electrode may be in one of four states: actuated, sensing, actuated and sensing, and not actuated nor sensing. The only limit on the range of usable encoding frequencies is that they must be outside the frequency band of the actuation signal.

Applications for Multiplexed Droplet Actuation and Sensing

The capability to monitor the position and dynamics of multiple droplets being actuated in parallel is critical for fault-tolerant operation of DMF systems. The various embodiments described within this disclosure facilitate closed-loop control of all DMF unit operations (e.g., droplet translation, splitting and dispensing) and provide the means for characterizing DMF devices and for selecting optimal operating parameters (e.g., voltage, frequency) for any given liquid. Details covering each of these applications are provided in the following sections.

Fault-Tolerant Droplet Translation and Routing

Open-loop control and manual droplet routing are often employed in experimental DMF systems which may be considered semi-automated. In such systems, collision avoidance (i.e., preventing unintended droplet merging) and monitoring of errors (e.g., detecting droplets that fail to move onto their intended target electrodes) are often performed visually by skilled operators. In contrast, fully-automated DMF systems require the capability to automatically detect points of failure and to dynamically reroute droplets in response. The development of such systems is made possible by the techniques and apparatus described in the present disclosure.

Figure 15:
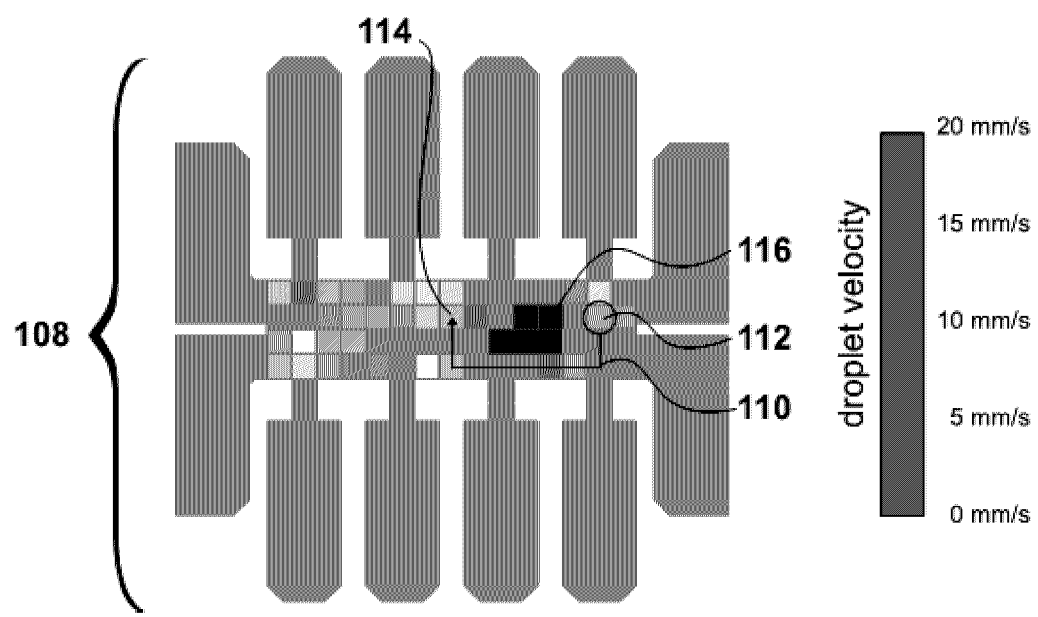
FIG. 15 shows a droplet velocity heat map: a schematic representation of a DMF device where each actuation electrode is colored to indicate the velocity of last droplet to pass over it.

As an example, FIG. 15 presents a velocity heat map 108: a schematic representation of the actuation electrodes constituting a sample DMF device 2 where each electrode is shaded to indicate the velocity of last droplet to pass over it (brighter shades indicate a higher velocity; i.e., more facile droplet movement). A DMF control system 24 employing multiplexed droplet actuation and sensing can continuously measure the velocity of all droplets being manipulated on the DMF device 2 during standard operation, thus ensuring that information is always up-to-date. Software algorithms designed to plan droplet routes (e.g., to route droplet 110 from electrode 112 to 114) can make use of such information to avoid electrodes with relatively low velocities 116. While this simple example describes automatic droplet routing based on previous measures of droplet velocity, other metrics calculated from electrode impedance or capacitance may also be used. Furthermore, routes can be dynamically adjusted in real time in the case of errors (e.g., due to dielectric breakdown on an electrode).

Optimization of Operating Parameters for Different Liquids

Figure 16:
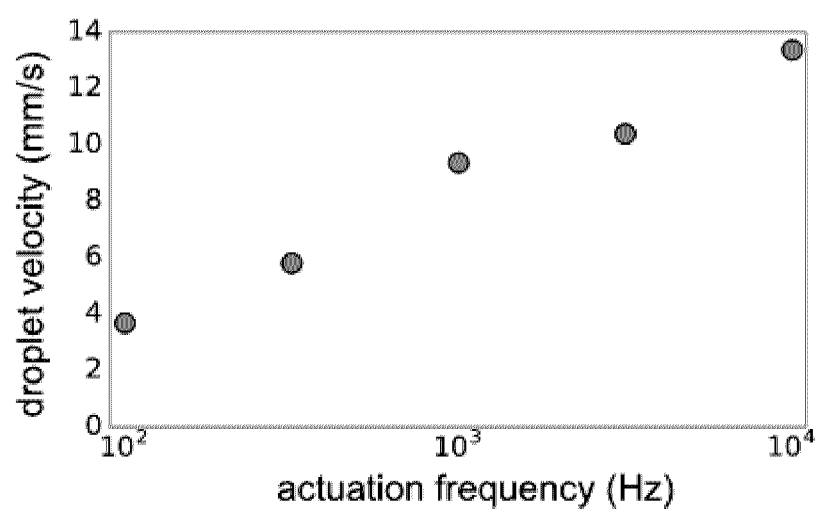
FIG. 16 shows the experimentally measured droplet velocity for a sample liquid plotted as a function of actuation frequency.

The optimal operating parameters (e.g., actuation voltage and frequency) for manipulating a given liquid on a DMF chip are often unknown a priori, especially when working with new liquids. In practice, these parameters are commonly determined through trial and error; however, a more systematic approach that is amenable to automation involves optimizing these parameters to achieve maximum droplet velocity or longevity (i.e., sustained droplet velocity over time). FIG. 16 shows an example of such a systematic approach, where the droplet velocity of a sample liquid is plotted as a function of frequency, clearly demonstrating the advantage of manipulating this particular liquid using higher actuation frequencies. Multiplexed droplet actuation and sensing enables characterization routines such as this to be employed for several droplets simultaneously.

Monitoring and Control of Splitting and Dispensing Operations

Figure 17A:
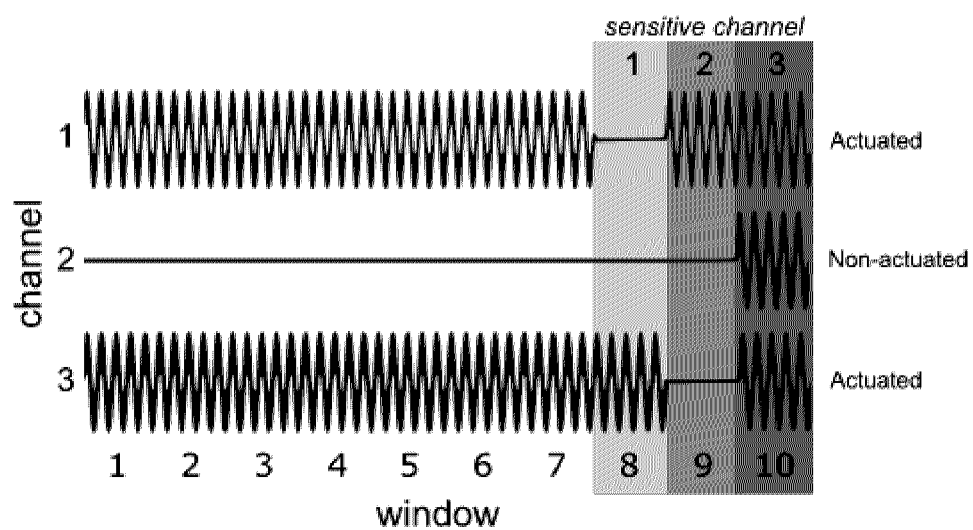
FIG. 17A shows a schematic of the separation of a droplet into two daughter droplets through the application of a voltage to two adjoining electrodes.
Figure 17B:
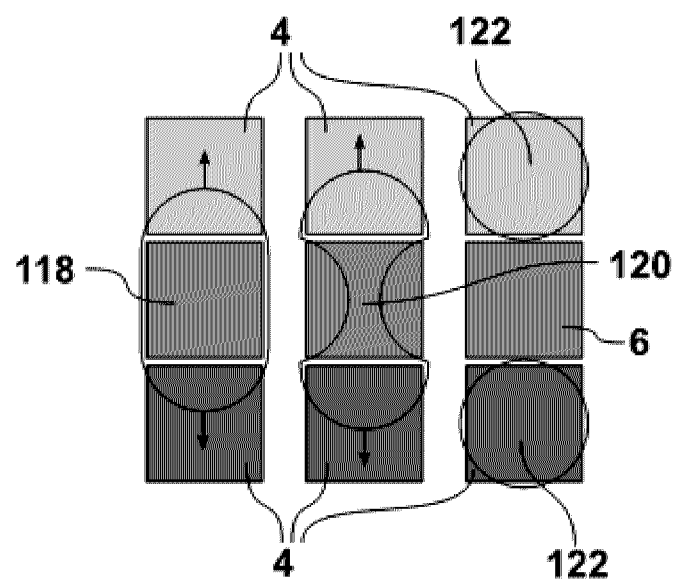
FIG. 17B shows a schematic representation of the time-division multiplexing waveforms applied to three different electrodes.
Figure 17C:
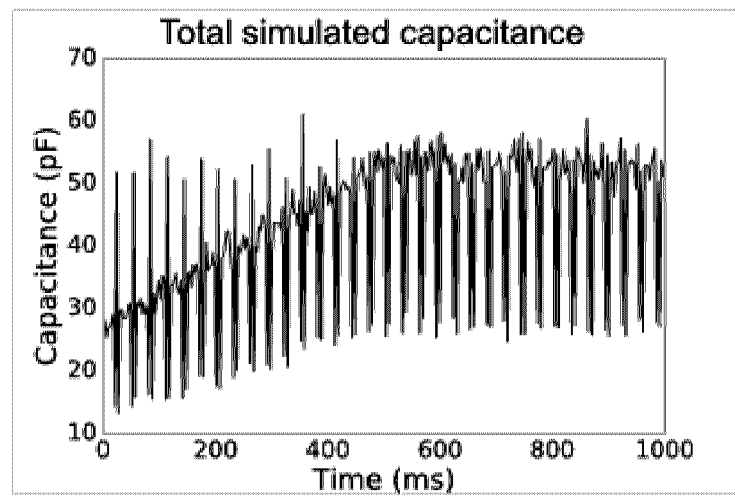
FIG. 17C shows a graphical representation of the total simulated capacitance for all electrodes involved in the splitting of a droplet into two daughter droplets.
Figure 17D:
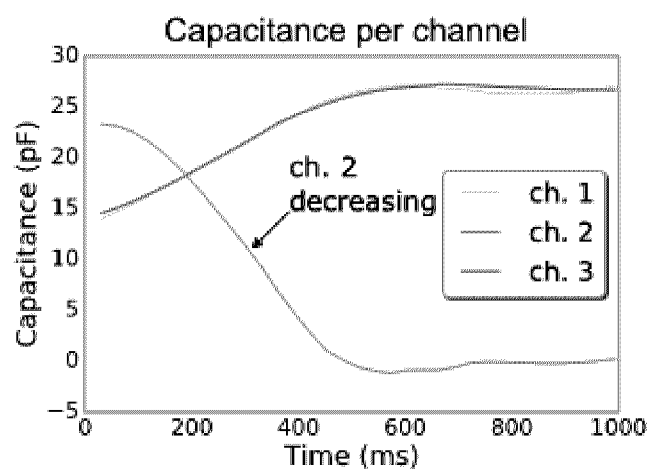
FIG. 17D shows a graphical representation of the capacitance per channel, decoded from the total simulated capacitance across all three electrodes.

Multiplexed droplet actuation and sensing holds great promise for monitoring and controlling the dynamics of splitting and dispensing and for validating the completion of these operations during automated experiments. FIGS. 17A-D demonstrates a computer simulation showing how the multi-droplet manipulation and sensing techniques described here could be applied to droplet splitting. As shown in FIG. 17A, a virtual droplet 118 is split over three electrodes, with normally distributed noise added to the capacitance values based on experimentally determined error. The actuation waveforms used in the simulation are plotted in FIG. 17B. The two outer electrodes were actuated for the entire simulation (90% duty cycle), while the center electrode was non-actuated 6, but sensitive (10% duty cycle). The total simulated capacitance is shown in FIG. 17C, while the capacitance measured for each channel is shown in FIG. 17D. These results demonstrate the capability of the embodied system to measure the volume of liquid in the necking region 120 which may be useful for verifying the completion of a splitting operation.

In general, splitting a droplet into two daughter droplets 122 requires an increase in the area of the droplet-filler media interface, which is energetically unfavorable. Therefore, for splitting to be achieved, driving forces must be applied such that the droplet is pulled from two ends with sufficient magnitude to overcome this energy barrier. As the droplet is stretched, liquid in the necking region 120 pinches together and eventually becomes unstable and breaks off.[12-14] Although the basic features and dynamics of this process are well understood, this process is highly dependent on surface heterogeneities and is therefore unpredictable. That is, splitting requires that the mother droplet 118 pass through an inherently unstable state, and this limits reproducibility and volume precision of the daughter droplets 122. Thus, achieving fully automated, reliable, and precise splitting requires some form of active feedback control.

Figure 18A:
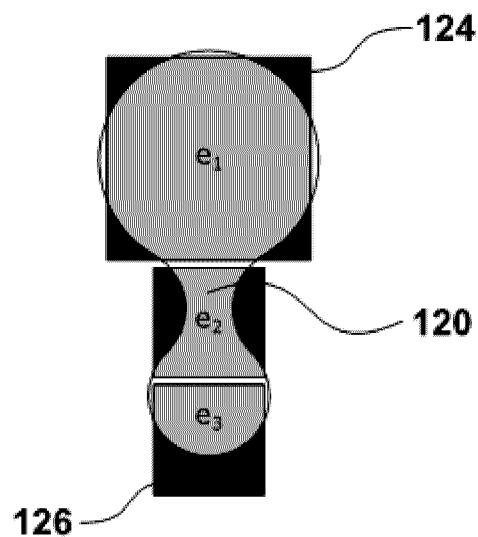
FIG. 18A shows a schematic representation of a dispensing operation, whereby a daughter droplet is created by pinching off a volume of liquid from a droplet contained by a larger reservoir electrode.
Figure 18B:
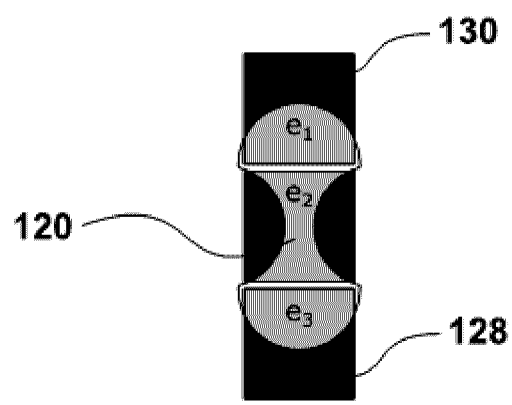
FIG. 18B shows a schematic of the separation of a droplet into two daughter droplets.
Figure 18C:
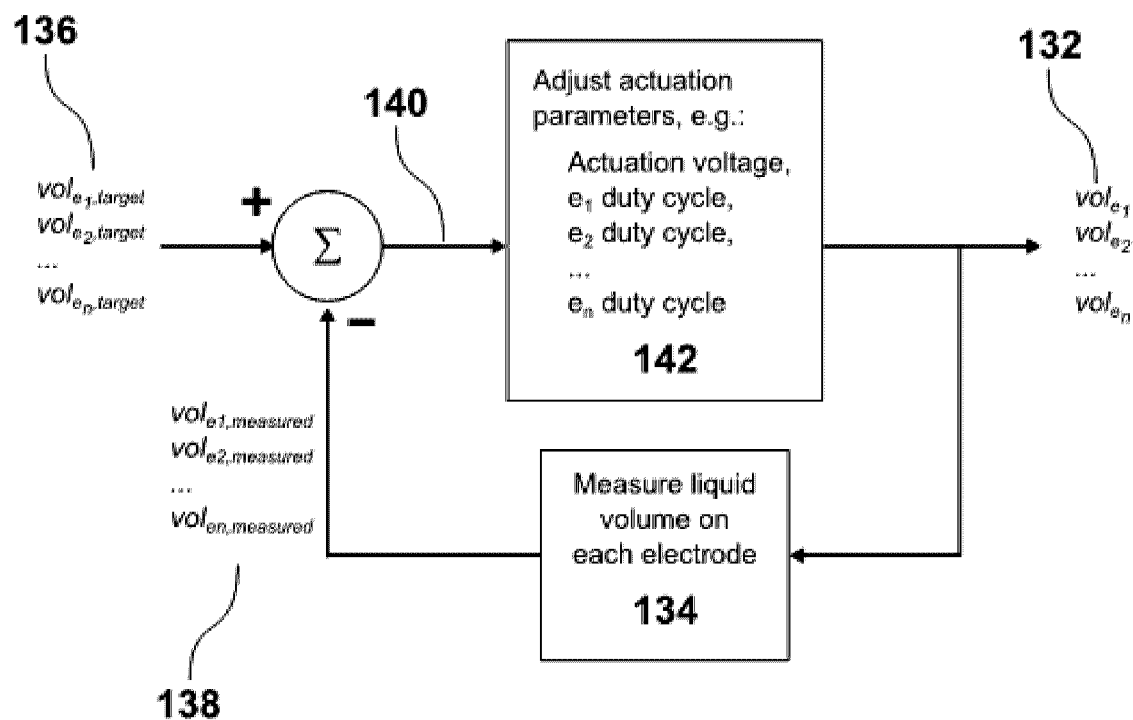
FIG. 18C shows an example flow-control diagram describing closed-loop control of a splitting/dispensing operation.

Closed-loop control has been previously shown to significantly improve the accuracy of droplet volume during splitting and dispensing operations; however, previously reported methods require the ability to independently adjust the voltage applied to each electrode.[9] This requires several high voltage signal generators which can translate into increased cost and circuit complexity. The experimental results in FIG. 9 demonstrate a linear correlation between droplet velocity and duty cycle, implying that the duty cycle of a single high voltage actuation signal can be modulated to control the time-averaged electrostatic force applied to a droplet overlapping any given electrode. By concurrently monitoring several sensitive channels through any encoding mechanism (e.g., TDM or FDM), the duty cycle of each channel can be independently adjusted to implement, for example, proportional-integral-derivative (PID) control during dispensing or splitting. FIGS. 18A and 18B demonstrate dispensing and splitting operations, respectively. Dispensing refers to pinching off a volume of liquid from a larger droplet contained by a reservoir electrode 124 by actuating a target electrode 126 and reservoir electrode 124 simultaneously. In FIG. 18B, a droplet is split in two by actuating two target electrodes 128, 130. FIG. 18C provides an example of a flow-control diagram describing closed-loop control of a splitting/dispensing operation. When a dispensing or splitting operation is initiated, the volume of liquid 132 overlapping each of the electrodes involved in the operation is continuously measured 134. The difference between target volumes 136 and the measured volumes 138 represents the error 140. Based on this time-varying error 140, the actuation parameters (e.g., actuation voltage, duty cycle for each actuation electrode, etc.) are continuously adjusted 142 until the operation is complete.

Figure 19:
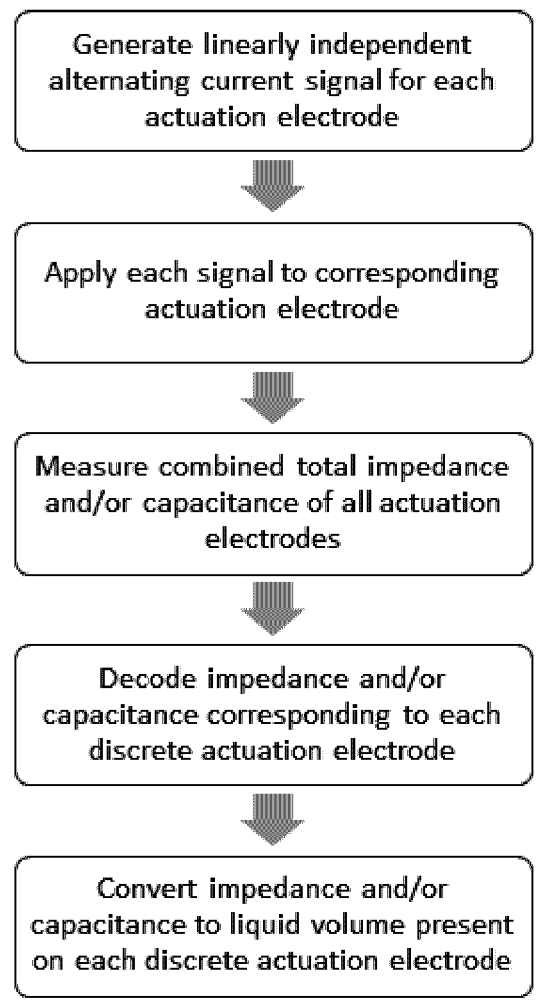
FIG. 19 is a flow chart showing an embodiment of a method of using the multi-droplet sensing and actuation system disclosed herein.

The present disclosure discloses a multi-droplet sensing and actuation system summarized in the flow chart in FIG. 19, for use in a digital microfluidic chip operation to track liquid volume and droplet position in real-time by generating linearly independent alternating current signals for each actuation electrode followed by applying each linearly independent alternating current signal to the respective discrete actuation electrode thus encoding the electrode's identity. The combined measured impedance signal from multiple channels is then processed to decode an impedance measurement for the volume between each discrete actuation electrode and its corresponding conductive counter electrode region, where the sensed impedance is inversely proportional to an amount of liquid within the volume.

Figure 20:
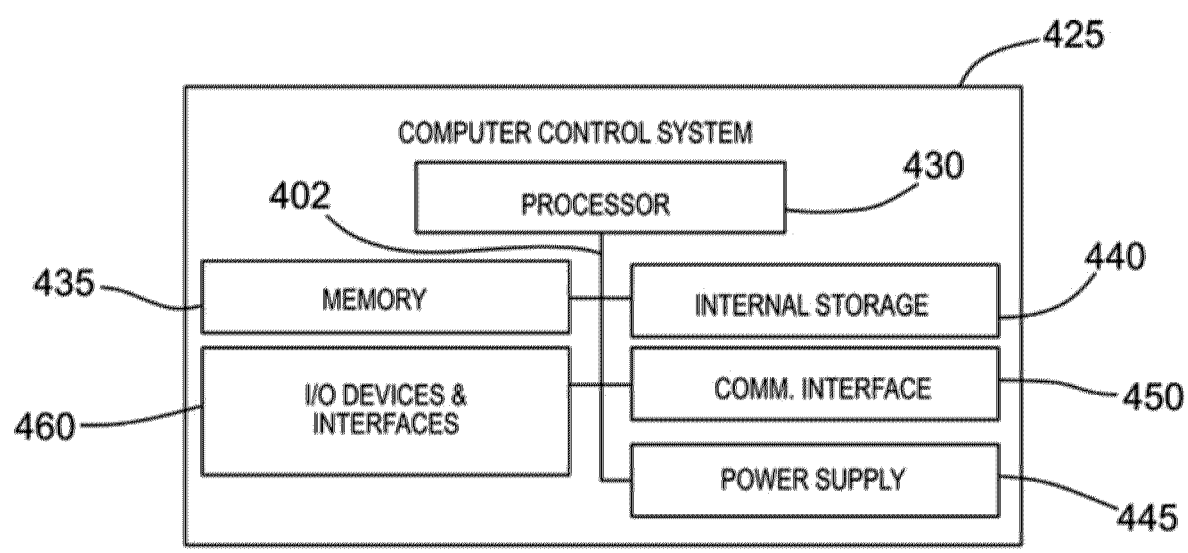
FIG. 20 shows an exemplary, non-limiting implementation of computer control system forming part of the DMF control system.

FIG. 20 provides an exemplary, non-limiting embodiment of a computer control system 425 incorporating microprocessor 28 (shown as processors 430 in FIG. 20) previously discussed. Computer control system 425, which includes one or more processors 430 (for example, a CPU/microprocessor), bus 402, memory 435, which may include random access memory (RAM) and/or read only memory (ROM), one or more internal storage devices 440 (e.g. a hard disk drive, compact disk drive or internal flash memory), a power supply 445, one more communications interfaces 450, and various input/output devices and/or interfaces 460 such as a user interface for a clinician to provide various inputs, run simulations etc.

Although only one of each component is illustrated in FIG. 20, any number of each component can be included computer control system 425. For example, a computer typically contains a number of different data storage media. Furthermore, although bus 402 is depicted as a single connection between all of the components, it will be appreciated that the bus 402 may represent one or more circuits, devices or communication channels which link two or more of the components. For example, in personal computers, bus 402 often includes or is a motherboard.

Computer control system 425 may be implemented as one or more physical devices that are coupled to processor 430 through one of more communications channels or interfaces. For example, computer control system 425 can be implemented using application specific integrated circuits (ASIC). Alternatively, computer control system 425 can be implemented as a combination of hardware and software, where the software is loaded into the processor from the memory or over a network connection.

Examples of computer-readable storage media include, but are not limited to, recordable and non-recordable type media such as volatile and non-volatile memory devices, read only memory (ROM), random access memory (RAM), flash memory devices, floppy and other removable disks, magnetic disk storage media, optical storage media (e.g., compact discs (CDs), digital versatile disks (DVDs), etc.), among others. The instructions can be embodied in digital and analog communication links for electrical, optical, acoustical or other forms of propagated signals, such as carrier waves, infrared signals, digital signals, and the like. The storage medium may be the internet cloud, or a computer readable storage medium such as a disc.

Examples of computer-readable storage media include, but are not limited to, recordable and non-recordable type media such as volatile and non-volatile memory devices, read only memory (ROM), random access memory (RAM), flash memory devices, floppy and other removable disks, magnetic disk storage media, optical storage media (e.g., compact discs (CDs), digital versatile disks (DVDs), etc.), among others. The instructions can be embodied in digital and analog communication links for electrical, optical, acoustical or other forms of propagated signals, such as carrier waves, infrared signals, digital signals, and the like.

The embodied work introduces a new multi-channel impedance sensing technique capable of simultaneously tracking the position and velocity of multiple droplets in parallel. The ability to sense electrodes that are non-actuated will make it possible to verify the progress and completion of splitting and dispensing operations, and to provide active feedback to these dynamic processes to achieve enhanced volume precision. The combination of these features will facilitate the development of high-level, automated, and fault-tolerant control of digital microfluidics. This technique is also capable of being implemented continuously over time to measure the change in static droplet volume allowing for real time monitoring of the rate of evaporation of the fluid droplet.

Time-division multiplexing (TDM) is implemented so that the impedance measurements are be performed quickly relative to the time-scale of droplet movement. The sensed impedance may then be tracked in real time to determine the position and velocity of multiple droplets simultaneously. The system can implement reliable, multiplexed protocols that can automatically detect points of failure and dynamically reroute droplets. The new system can validate not only droplet translation operations, but also splitting and dispensing operations. In addition, multi-electrode velocity data can be tabulated to record changing resistive forces (e.g., caused by adsorbed proteins) on a per electrode basis, and the system can be programmed to adapt accordingly.

While the teachings described herein are in conjunction with various embodiments for illustrative purposes, it is not intended that these teachings be limited to such embodiments. On the contrary, the teachings described and illustrated herein encompass various alternatives, modifications, and equivalents, without departing from the embodiments, the general scope of which is defined in the appended claims.

Except to the extent necessary or inherent in the processes themselves, no particular order to steps or stages of methods or processes described in this disclosure is intended or implied. In many cases the order of process steps may be varied without changing the purpose, effect, or import of the methods described.

What is claimed is:

1. A digital microfluidic chip device, comprising:
   A) a digital microfluidic chip including
      i) a first substrate having mounted on a surface thereof a first array of discrete actuation electrodes;
      ii) a dielectric layer coating said first array of discrete actuation electrodes, said dielectric layer having a hydrophobic surface;
      iii) a second substrate having a hydrophobic surface on a conductive counter electrode, wherein the second substrate is in a spaced relationship to the first substrate thus defining a region between the first and second substrates; and
   B) an active control system including
      i) a controller programmed for selectively actuating and de-actuating said discrete actuation electrodes, said controller being configured to apply a different linearly independent alternating current electrical signal to each discrete actuation electrode such that said linearly independent alternating current electrical signal encodes the electrode's identity;
      ii) an impedance sensor for sensing, in parallel, an impedance in a volume between each discrete actuation electrode and a corresponding conductive counter electrode region spaced from said discrete actuation electrode, said impedance sensor being configured to process a combined measured impedance signal in order to decode from said combined measured impedance signal a distinct impedance measurement for the volume between each discrete actuation electrode and its corresponding conductive counter electrode region, wherein the impedance sensed in the volume between a given actuation electrode and said corresponding conductive counter electrode region is inversely proportional to an amount of liquid in said volume.

2. The microfluidic device according to claim 1, wherein said different linearly independent alternating current electrical signals are generated for each discrete actuation electrode by turning an alternating current signal, which is common to all discrete actuation electrodes, on and off in a sequence of pre-programmed steps distinct from all other discrete actuation electrodes.

3. The microfluidic device according to claim 1, wherein said active control system is configured to apply different alternating current (AC) signals with different frequencies to each discrete actuation electrode.

4. The microfluidic device according to claim 1, wherein said different linearly independent alternating current electrical signals are generated for each discrete actuation electrode by:
   i) generating a linearly independent low voltage AC encoding signal that is unique to each discrete actuation electrode, and
   ii) applying said linearly independent low voltage AC encoding signal to each discrete actuation electrode as is or coupling it onto an AC actuation signal that is common to all actuation electrodes.

5. The microfluidic device according to claim 1, wherein said different linearly independent alternating current electrical signals are generated for each discrete actuation electrode by:
   i) generating a linearly independent low voltage AC encoding signal that is unique across a subset of discrete actuation electrodes,
   ii) turning said linearly independent low voltage AC encoding signal on and off in a sequential pattern to generate a switched signal distinct from all other discrete actuation electrodes in said subset
   iii) applying the switched signal to each discrete actuation electrode as is or coupling it onto an AC actuation signal that is common to all actuation electrodes.

6. The microfluidic device according to claim 1, wherein said active control system is configured to apply different alternating current (AC) signals at different frequencies to each different subset of discrete actuation electrodes such that each subset of discrete actuation electrodes receives the same frequency different from each other subset.

7. The microfluidic device according to claim 6, wherein said active control system is configured to apply, to each discrete actuation electrode within each subset, a uniquely encoded alternating current signal which is generated by turning the alternating current signal corresponding to its associated subset, on and off in a sequential pattern distinct from all other discrete actuation electrodes within its subset.

8. The microfluidic device according to claim 1, wherein said conductive counter electrode is a single counter electrode section.

9. The microfluidic device according to claim 1, wherein said conductive counter electrode includes multiple conductive electrode sections electrically isolated from each other.

10. A method for measuring properties of a fluid droplet on a DMF (digital microfluidic) device, comprising,
   generating different linearly independent alternating current electrical signals;

applying a different linearly independent alternating current signal to each discrete actuation electrode to actuate said electrode;

measuring the total impedance, capacitance or combination of impedance and capacitance of all actuation electrodes, or a subset of actuation electrodes, to decode one or a combination of the impedance and capacitance measurement for each discrete actuation electrode; and processing each of the measurements to measure the volume of liquid between each discrete actuation electrode and its corresponding conductive counter electrode region.

11. The method according to claim 10 wherein an alternating current signal is generated so that a linearly independent alternating current signal with a unique frequency is applied to each of the discrete actuation electrodes.

12. The method according to claim 10, further comprising manipulating said fluid droplet to move said fluid droplet onto an adjacent discrete actuation electrode by applying a linearly independent alternating current signal to said discrete actuation electrode that is adjacent to the discrete actuation electrode on which the fluid droplet is detected.

13. The method according to claim 12, wherein the position of the fluid droplet is measured; and said fluid droplet is manipulated to prevent unintended merging of said fluid droplet with a plurality of additional fluid droplets which are located on the DMF device.

14. The method according to claim 10, further comprising manipulating said fluid droplet to split into two discrete droplets by applying linearly independent alternating current signals to two or more discrete actuation electrodes which are position adjacent to the discrete actuation electrode(s) on which the fluid droplet is detected.

15. The method according to claim 10, further comprising dispensing a portion of said fluid droplet onto an adjacent discrete actuation electrode by applying linearly independent alternating current signals to both the adjacent discrete actuation electrode and the discrete actuation electrode on which a fluid droplet is detected.

16. The method according to claim 10, wherein the capacitance of each discrete actuation electrode is measured continuously as a function of time; and wherein said capacitance measurements are used to calculate the velocity of a fluid droplet.

17. The method according to claim 16, wherein the velocity of fluid droplets measured across multiple discrete actuation electrodes are combined to display a schematic representation of the actuation electrodes wherein each electrode is colored to indicate the velocity of last droplet to pass over it.

18. The method according to claim 10, wherein one or a combination of the impedance and capacitance is measured continuously to measure the change in static droplet volume over time; and wherein said change in droplet volume over time is used to determine the rate of evaporation of the fluid droplet.

19. The method according to claim 10, further comprising optimizing the operating parameters for manipulating a fluid droplet of a given liquid on a DMF chip to achieve maximum droplet velocity or sustained droplet velocity over time; wherein the optimizing comprises plotting the droplet velocity of a sample liquid as a function of one or a combination of the frequency and voltage to determine one or a combination of the frequency and voltage that will result in a maximum droplet velocity or sustained droplet velocity over time.

20. The method according to claim 10, wherein the method is employed for several droplets simultaneously.

* * * * *